United States Patent
Nakao et al.

(10) Patent No.: US 8,773,962 B2
(45) Date of Patent: Jul. 8, 2014

(54) INFORMATION RECORDING AND REPRODUCING DEVICE AND METHOD FOR DETERMINING DETERIORATION OF INFORMATION RECORDED IN A RECORDING MEDIUM

(71) Applicant: Panasonic Corporation, Osaka (JP)

(72) Inventors: Masahito Nakao, Osaka (JP); Kenji Kondo, Osaka (JP); Yoshihisa Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/819,130

(22) PCT Filed: Oct. 3, 2012

(86) PCT No.: PCT/JP2012/006334
§ 371 (c)(1),
(2), (4) Date: Feb. 26, 2013

(87) PCT Pub. No.: WO2013/051250
PCT Pub. Date: Apr. 11, 2013

(65) Prior Publication Data
US 2014/0086032 A1    Mar. 27, 2014

(30) Foreign Application Priority Data

Oct. 6, 2011   (JP) .................................. 2011-221607

(51) Int. Cl.
*G11B 20/18*   (2006.01)
(52) U.S. Cl.
USPC ....................................................... 369/53.35
(58) Field of Classification Search
USPC ....................... 369/47.14, 53.17, 53.35, 53.36
See application file for complete search history.

(56) References Cited

U.S. PATENT DOCUMENTS 7,366,963 B2 * 4/2008 Yoshida .................. 714/705
2007/0133376 A1 * 6/2007 Abe et al. ................ 369/124.1

(Continued)

FOREIGN PATENT DOCUMENTS

| JP | 62264482 A | * | 11/1987 | ............. G11B 20/18 |
| JP | 63025871 A | * | 2/1988  | ............. G11B 20/18 |

(Continued)

OTHER PUBLICATIONS

International Search Report issued Oct. 30, 2012 in International (PCT) Application No. PCT/JP2012/006334.

*Primary Examiner* — Brenda Bernardi
(74) *Attorney, Agent, or Firm* — Wenderoth, Lind & Ponack, L.L.P.

(57) ABSTRACT

An information recording and reproducing device has a recording section, a reproducing section, and a deterioration detection processor which detects deterioration of a signal quality of information recorded in a recording medium. The deterioration detection processor reproduces information recorded in a first area of the medium, using the reproducing section, to acquire first comparison information representing a signal quality, records information, using the recording section, in a second area of the medium different from the first area after the information recorded in the first area is recorded in the first area, and reproduces, using the reproducing section, the information recorded in the second area to acquire second comparison information representing a signal quality, and determines that the signal quality of the information recorded in the medium is deteriorated, in a case where the second comparison information represents a signal quality higher than that represented by the first comparison information.

13 Claims, 15 Drawing Sheets

(56) References Cited

U.S. PATENT DOCUMENTS

| | | |
|---|---|---|
| 2007/0291388 A1 | 12/2007 | Yoshida et al. |
| 2008/0117751 A1* | 5/2008 | Read .......................... 369/47.14 |
| 2009/0316542 A1 | 12/2009 | Shirota |
| 2010/0080097 A1 | 4/2010 | Nakamae |

FOREIGN PATENT DOCUMENTS

| | | | | |
|---|---|---|---|---|
| JP | 03071472 A | * | 3/1991 | ............. G11B 20/18 |
| JP | 03194765 A | * | 8/1991 | ............. G11B 19/04 |
| JP | 03263616 A | * | 11/1991 | ............. G11B 7/00 |
| JP | 4-134772 | | 5/1992 | |
| JP | 05127836 A | * | 5/1993 | ............... G06F 3/06 |
| JP | 7-93803 | | 4/1995 | |
| JP | 8-111074 | | 4/1996 | |
| JP | 2002-8323 | | 1/2002 | |
| JP | 2004-118899 | | 4/2004 | |
| JP | 2007-80363 | | 3/2007 | |
| JP | 2007-335012 | | 12/2007 | |
| JP | 2008-210420 | | 9/2008 | |
| JP | 2010-86601 | | 4/2010 | |
| JP | 5160777 B2 | * | 3/2013 | |
| WO | 2008/062536 | | 5/2008 | |

* cited by examiner

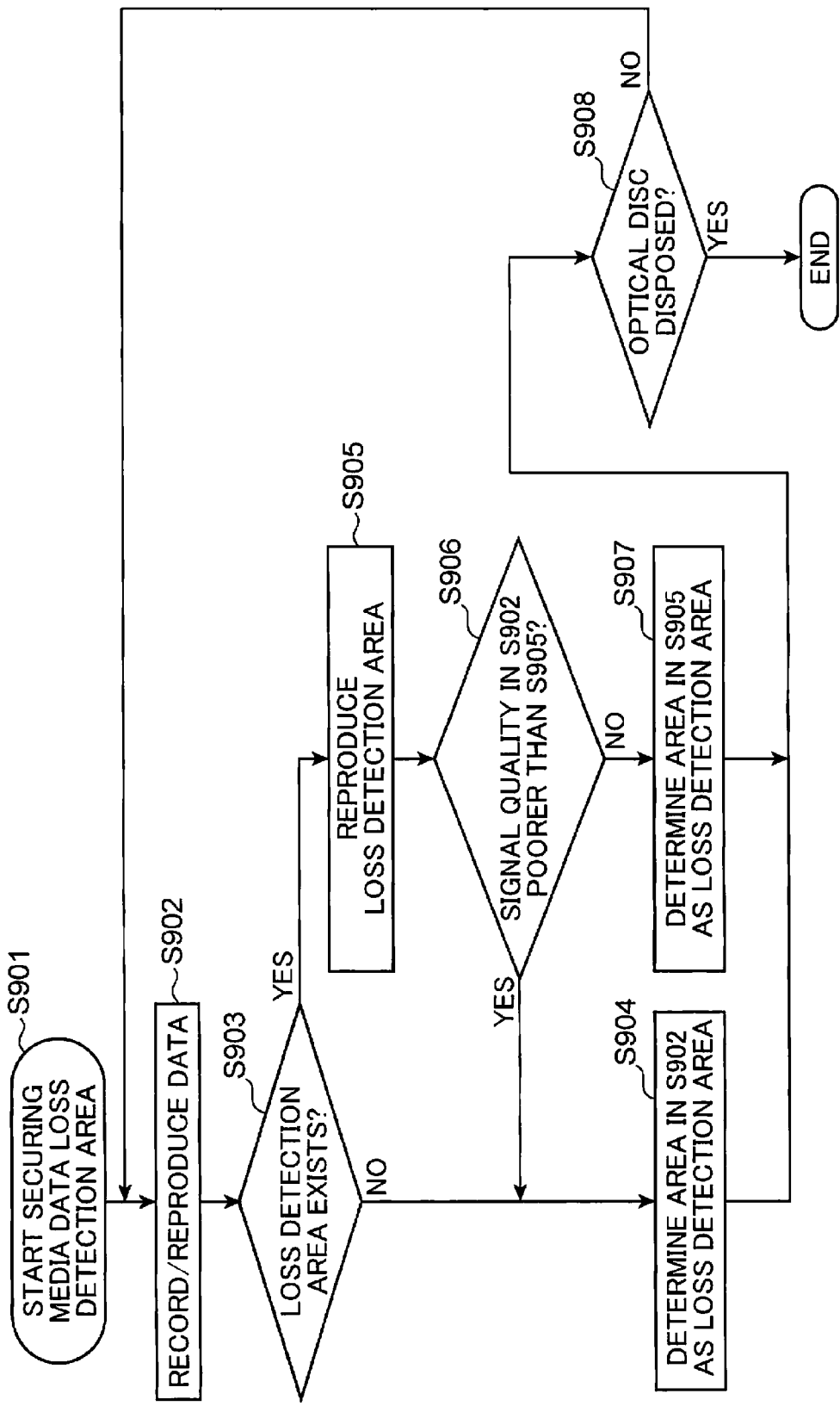

INFORMATION RECORDING AND REPRODUCING DEVICE AND METHOD FOR DETERMINING DETERIORATION OF INFORMATION RECORDED IN A RECORDING MEDIUM

TECHNICAL FIELD

The present invention relates to a technology for detecting deterioration of information recorded in a recording medium to be used in an information recording and reproducing device that records and reproduces information.

BACKGROUND ART

In the field of information recording and reproducing devices for recording and reproducing data such as moving images or sounds, there have been developed information recording and reproducing devices including mountable/dismountable recording media such as optical discs, and optical disc drive devices for handling the recording media. As recording media for storing data for a long period, the optical discs are paid attention to.

It is true that optical discs are excellent recording media for storing data for a long period. However, in the case where data is recorded and stored in optical discs, several problems are involved resulting from deterioration of the optical discs and the optical disc drive devices.

Firstly, a recording mark formed on an optical disc may be deteriorated due to a storage environment or a usage condition, which may cause deterioration of the quality of a signal reproduced by an optical disc drive device. In a worst case, it becomes impossible to read out the recorded information. This is a problem called deterioration of recorded data in an optical disc. Further, deterioration of a recording film of an optical disc makes it difficult to form a recording mark, which makes it difficult to record data. In a worst case, it becomes impossible to secure a recordable state of an optical disc, from which a reproduction signal of a quality reproducible by an optical disc drive device is obtained. This is a problem called deterioration of the recording performance of an optical disc.

Further, in an optical disc drive device, deterioration of characteristics of a laser, adhesion of dust, deterioration of a transmission path for transmitting a reproduced signal, and deterioration of a spindle motor for rotating an optical disc may occur depending on a storage environment or a usage condition. In such a case, in spite of the fact that a recording mark is formed on an optical disc, which is reproducible by an optical disc drive device not deteriorated without a problem, the quality of a reproduction signal, reproduced by a deteriorated optical disc drive device, may be deteriorated. This is a problem called deterioration of the reproducing performance of an optical disc drive device. Further, it may become impossible to accurately form a recording mark by an influence such as deterioration of characteristics of a laser or deterioration of a transmission path for transmitting a recording signal, regardless of a fact that an optical disc is not deteriorated. This is a problem called deterioration of the recording performance of an optical disc drive device.

There are proposed several countermeasures against the aforementioned problems.

As a method for detecting deterioration of an information recording and reproducing device, there is proposed a method for detecting deterioration of the reproducing performance of an information recording and reproducing device by providing a reflection surface for detecting a reflection light amount of a laser in a drive device, and by detecting deterioration of the laser based on a change in the reflection light amount (see patent literature 1).

Further, as a method for detecting deterioration of an information recording and reproducing device, there is proposed a method for detecting deterioration of the recording performance of an information recording and reproducing device by preparing a reference medium, recording test data in the reference information recording medium, and detecting the number of spare sectors used at the time of reproduction (see patent literature 2).

Further, as a method for detecting an influence of dust, which is one of the factors of deterioration of an information recording and reproducing device, there is proposed a method for detecting an influence of dust adhered to an objective lens by providing a cartridge, including a light source and a light receiving element, for detecting dust, and by comparing a light amount of light emitted from the light source with a light amount detected by the light receiving element (see patent literature 3).

Further, as a method for detecting deterioration of the reproducing performance of an information recording and reproducing device, there is proposed a method including: calculating a quality value of a reproduction signal based on a correction condition in performing a Viterbi decoding process of the reproduction signal obtained by reading out predetermined data; and determining whether the reproducing performance of an information recording and reproducing device is deteriorated based on a change in the quality value (see patent literature 4).

Further, as a method for detecting deterioration of the recording performance of a recording medium, there is proposed a method for detecting deterioration of the recording performance of a recording medium by detecting a change in the error rate of recorded/reproduced data (see patent literature 5).

Further, as a method for detecting deterioration of data recorded in a recording medium, there is proposed a method for detecting deterioration of data recorded in a recording medium, with use of a change in the error rate detected by reproducing data in a predetermined area, a reproduction time, or the number of times of reproduction (see patent literature 6).

CITATION LIST

Patent Literature

Patent literature 1: JP Hei 7-93803A
Patent literature 2: JP 2002-8323A
Patent literature 3: JP Hei 4-134772A
Patent literature 4: JP 2007-335012A
Patent literature 5: JP Hei 8-111074A
Patent literature 6: JP 2007-80363A

SUMMARY OF INVENTION

The conventional deterioration detection methods respectively have the following problems.

In patent literature 1, it is necessary to provide a test reflection surface for detecting a reflection light amount of a laser in a disc or in an information recording and reproducing device. The test reflection surface is located at an inner periphery of a disc in patent literature 1, and there is a concern that the recording and reproducing area in the disc inner periphery is reduced, and a commercially available standard disc cannot be used as it is. Alternatively, the movable range of an optical head is required to be expanded to the disc inner periphery, which makes it necessary to change the structure of the information recording and reproducing device. Further, in the case where a test reflection surface is provided in the information recording and reproducing device, the movable range of the optical head is required to be expanded to the disc inner periphery than an ordinary information recording and reproducing device, which makes it necessary to change the structure of the information recording and reproducing device. As a result, the configuration of the information recording and reproducing device is complicated, which is also not preferable to users in the aspect of media compatibility and the cost. Further, according to this method, in the case where dust and the like adhere to the test reflection surface, and the reflectance of the test reflection surface varies, the reflection light amount may vary substantially in the same manner as in the case where a laser is deteriorated. Thus, it becomes impossible to clearly determine that the laser is deteriorated. Hence, it becomes necessary to strictly manage the test recording medium.

Further, in patent literature 2, a reference recording medium is necessary for detecting deterioration of the recording performance of the information recording and reproducing device. This requires manufacturing and management of the reference recording medium. In addition, it is presumed that the characteristics of the reference recording medium may be deteriorated due to an influence of a storage environment. Accordingly, it is necessary to manage the reference recording medium with sufficient care in order to clearly determine whether the information recording and reproducing device is deteriorated, or the reference recording medium is deteriorated. For instance, it is necessary to store a reference recording medium in a low-temperature warehouse or to periodically check the characteristics of the reference recording medium by a reference machine.

Further, in patent literature 3, it is necessary to prepare a special cartridge for detecting an influence of dust adhered to the objective lens. In addition, it is also necessary to make the information recording and reproducing device have a special structure so that the cartridge for detection can be inserted. Thus, the configuration of the information recording and reproducing device becomes complicated, leading to a cost increase. Hence, it is also not preferable to users.

Further, in patent literature 4, deterioration of the reproducing performance of the information recording and reproducing device is detected. However, as in the case where the information recording and reproducing device is deteriorated, in the case where data recorded in a recording medium is deteriorated, the decoding condition in performing a Viterbi decoding process changes. As a result, there is a problem that it is impossible to clearly discriminate whether the data recorded in the recording medium is deteriorated, or the reproducing performance of the information recording and reproducing device is deteriorated.

Likewise, in patent literature 5, deterioration of the recording performance of a recording medium is detected. However, as in the case where the recording performance of the recording medium is deteriorated, in the case where the recording performance of the information recording and reproducing device is deteriorated, the error rate is deteriorated. Accordingly, it is impossible to clearly discriminate whether the recording medium is deteriorated, or the information recording and reproducing device is deteriorated.

Further, in patent literature 6, deterioration of data recorded in a recording medium is detected. However, as in the case where data is deteriorated, in the case where the reproducing performance of the information recording and reproducing device is deteriorated, the error rate is deteriorated. Accordingly, it is impossible to clearly discriminate whether the recording medium is deteriorated, or the information recording and reproducing device is deteriorated.

In view of the above, an object of the invention is to provide an information recording and reproducing device and an information recording and reproducing method that enable to detect deterioration of information in a recording medium, without the need of a special structure or a reference recording medium for detecting various deteriorations.

An information recording and reproducing device according to an aspect of the invention is an information recording and reproducing device that records and reproduces information in a recording medium, includes: a recording section which records information in the recording medium; a reproducing section which reproduces the information recorded in the recording medium; and a deterioration detection processor which detects deterioration of a signal quality of the information recorded in the recording medium, wherein the deterioration detection processor: reproduces information recorded in a first area of the recording medium, with use of the reproducing section, to acquire first comparison information representing a signal quality; records information, with use of the recording section, in a second area of the recording medium different from the first area after the information recorded in the first area is recorded in the first area, and reproduces, with use of the reproducing section, the information recorded in the second area to acquire second comparison information representing a signal quality; and determines that the signal quality of the information recorded in the recording medium is deteriorated, in a case where the second comparison information represents a signal quality higher than that represented by the first comparison information.

According to the invention, it becomes possible to accurately detect deterioration of information in the recording medium by acquiring the first comparison information and the second comparison information, without configuring the recording medium into a specific structure and without using a reference recording medium for detecting deterioration of recorded information.

BRIEF DESCRIPTION OF DRAWINGS

FIG. 15 is a diagram showing an example of a flowchart for securing a media data loss detection area in the embodiment of the invention.

DESCRIPTION OF EMBODIMENTS

Figure 1:
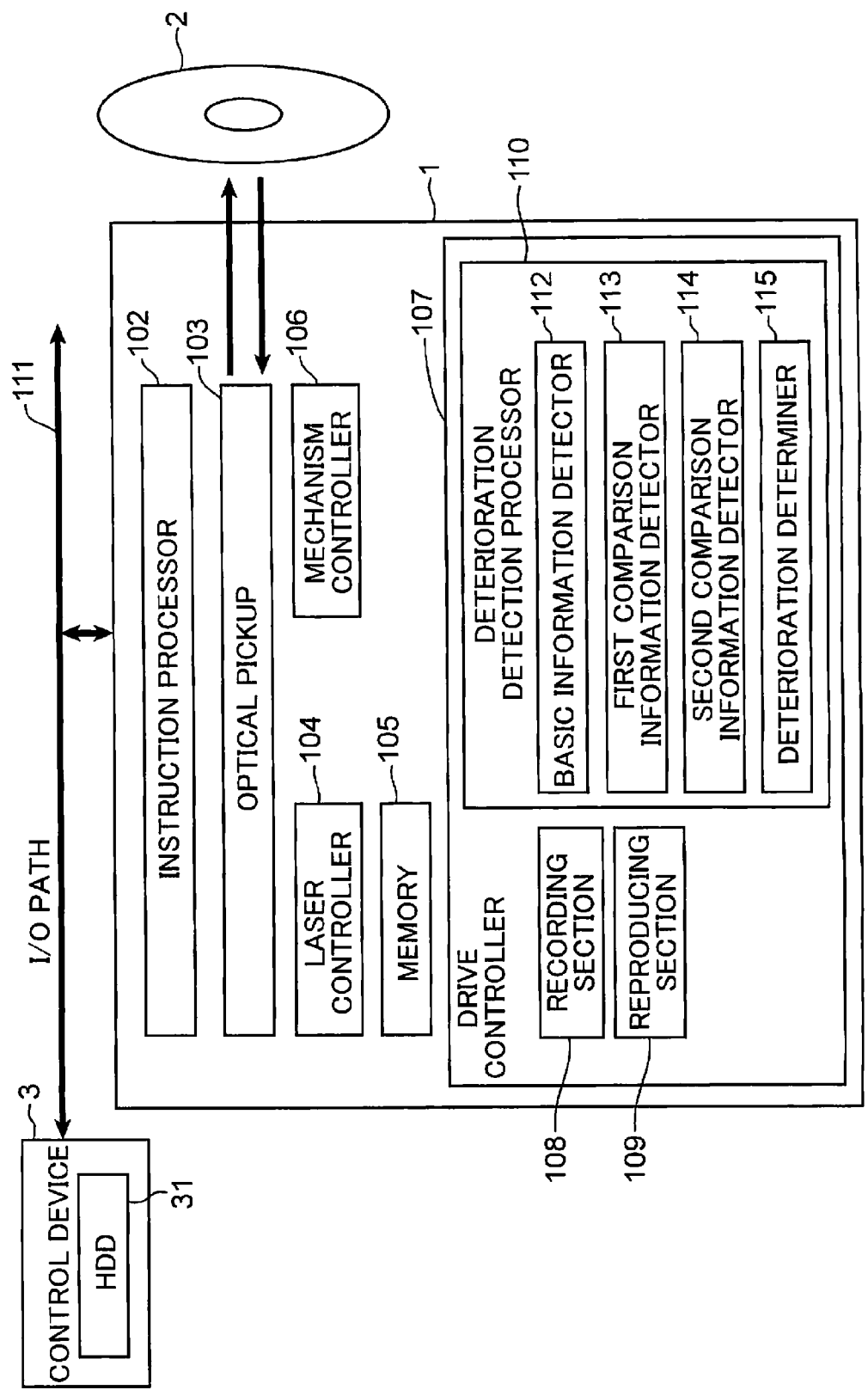
FIG. 1 is a diagram showing a configuration example of an optical disc drive device according to an embodiment of the invention.

In the following, an embodiment of the invention will be described referring to the drawings. The following embodiment is an example embodying the invention, and does not limit the technical range of the invention.

(Embodiment)

FIG. 1 shows a configuration example of an optical disc drive device according to an embodiment of the invention.

An optical disc drive device 1 as an example of an information recording and reproducing device is connected to a master control device 3 via an I/O path 111. The control device 3 is e.g. a host computer (host PC).

The optical disc drive device 1 is provided with an instruction processor 102 that communicates with the control device 3 and processes an instruction from the control device 3, an optical pickup 103 that irradiates an optical disc 2 as an example of a recording medium with laser light for recording/reproducing, a laser controller 104 that controls the laser power, which is outputted from the optical pickup 103, and the like, a mechanism controller 106 that performs servo control such as moving the optical pickup 103 to a target position, a memory 105 that manages recorded and reproduced data or other information, and temporarily stores recorded and reproduced data and/or information as a buffer, and a drive controller 107 that performs integrated control of overall drive processings such as recording/reproducing processing with respect to the optical disc 2.

The drive controller 107 is provided with a recording section 108 and a reproducing section 109 that perform data recording/reproducing of data or management information, and a deterioration detection processor 110 that detects deterioration of the optical disc 2 or the optical disc drive device 1 and performs countermeasures against the deterioration. For instance, the deterioration detection processor 110 determines whether the data recorded in the optical disc 2 is deteriorated, and performs processing and control such as countermeasures against a case that the possibility of losing data is increased, resulting from data deterioration.

Further, the deterioration detection processor 110 is provided with a basic information detector 112, a first comparison information detector 113, a second comparison information detector 114, and a deterioration determiner 115. The basic information detector 112 detects information representing a signal quality at the time of recording and reproducing data. The first comparison information detector 113 detects information representing a signal quality by reproducing the same area as the area from which the information representing a signal quality has been detected by the basic information detector 112. The second comparison information detector 114 detects information representing a signal quality by recording and reproducing an area different from the area, from which the information representing a signal quality has been detected by the basic information detector 112. The deterioration determiner 115 determines whether the data recorded in the optical disc 2 is deteriorated by using the information representing a signal quality obtained from at least the first comparison information detector 113 and the second comparison information detector 114, among the three information representing signal qualities obtained from the basic information detector 112, the first comparison information detector 113, and the second comparison information detector 114.

The configuration of the optical disc drive device 1 shown in FIG. 1 is not limited to the above. As far as substantially the same effect as described above can be obtained, any configuration is applicable. For example, the deterioration detection processor 110 is configured to function independently of the recording section 108 and of the reproducing section 109. Alternatively, the deterioration detection processor 110 may detect data deterioration with use of the functions of the recording section 108 and the reproducing section 109. Further, the configuration may be that the deterioration detection processor 110 is provided inside the recording section 108 or inside the reproducing section 109, and acquires a necessary signal from the recording section 108 or from the reproducing section 109 for processing. Further, it may be configured in such a manner that the basic information detector 112, the first comparison information detector 113, the second comparison information detector 114, and the deterioration determiner 115 are provided independently, and that the deterioration detection processor 110 controls the detection of deterioration or the processing to countermeasure against the deterioration.

Next, various deteriorations of the optical disc 2 and of the optical disc drive device 1 are described.

Firstly, there exists media data deterioration in the optical disc 2. In the media data deterioration, the signal quality of a signal obtained by reproduction with use of the optical disc drive device 1 is deteriorated resulting from deterioration of a recording mark recorded in the optical disc 2 due to an influence such as a storage environment or a usage condition, and in a worst case, it becomes impossible to read out the recorded information. Further, there exists a recording performance deterioration of optical discs (media). In the recording performance deterioration, it becomes difficult to form a recording mark due to deterioration of a recording film and the like of the optical disc 2, and in a worst case, it becomes impossible to form a recording mark capable of obtaining a signal of such a signal quality as to reproduce data with use of the optical disc drive device 1.

Further, there exists a deterioration also in the optical disc drive device 1. There exists reproducing performance deterioration of the optical disc drive. Specifically, as with the case of the optical disc 2, there occurs deterioration of characteristics of a laser, adhesion of dust, deterioration of a transmission path for transmitting a reproduced signal, and deterioration of a spindle motor for rotating the optical disc 2, due to an influence such as a storage environment or a usage condition, which leads to deterioration of the signal quality even in the case where the optical disc 2, in which media data is not deteriorated, is reproduced. Further, there exists a recording performance deterioration of the optical disc drive, in which it becomes difficult to form a recording mark, with use of such an optical disc drive, in recording information into an optical disc 2 of which the recording performance is not deteriorated.

As described above, there exists the media data deterioration and the recording performance deterioration of media in the optical disc 2, and there exists the reproducing performance deterioration of the optical disc drive and the recording performance deterioration of the optical disc drive in the optical disc drive device 1.

Among these deteriorations, the most serious deterioration is the media data deterioration. In the case where media data is deteriorated, a recording mark formed in the media is deteriorated. Accordingly, by whichever optical disc drive device 1, such media are reproduced, the signal quality of a reproduced signal is deteriorated, and it becomes difficult to reproduce the data, and in a worst case, it becomes impossible to reproduce the data. In such a case, the data recorded by the user is lost.

Here, the cases, in which deteriorations other than the media data deterioration have occurred, are described. In the case where the recording performance of media is deteriorated, it becomes difficult to form a recording mark resulting from deterioration of a recording film of the media. In other words, it becomes difficult or impossible to record data. In such a case, in a system incorporated with the optical disc drive device 1, it is an ordinary practice that an error processing is performed at the time of recording. For instance, a recording operation is performed again as a retry, and in the case where it is impossible to record data even after the retry, the system is configured to suspend the recording operation, and to notify a master device (e.g. the control device 3), whereby loss of user data being recorded is prevented. In the case where the recording performance of media is deteriorated, there is no likelihood that data recorded by the user may be lost, because there is no adverse influence on the data that has already been recorded in the media.

Further, in the case where the reproducing performance of the optical disc drive is deteriorated, it becomes difficult or impossible to reproduce the data recorded in the optical disc 2. However, there is no adverse influence on the data recorded in the optical disc 2. As far as there is no problem regarding the data recorded in the optical disc 2, for instance, it is possible to reproduce the data with use of another optical disc drive device 1. Thus, there is no likelihood that the data recorded by the user may be lost.

Further, in the case where the recording performance of the optical disc drive is deteriorated, it becomes difficult or impossible to newly record data in the optical disc 2. However, as in the case where the recording performance of media is deteriorated, there is no likelihood that data being recorded may be lost since an error processing is performed at the time of recording. Further, there is no likelihood that data may be lost, because there is no adverse influence on the already recorded data.

As described above, in the case where media data is deteriorated, the possibility that user data recorded by the user is lost is increased. Thus, it is most important to detect deterioration of media data. It becomes possible to prevent data loss, if it is possible to detect deterioration of media data, and if it is possible to preliminarily detect the increase of the possibility of losing data due to deterioration of media data to perform countermeasures before data loss.

In view of the above, in the following, there are described a method for detecting deterioration of media data in the case where media data is deteriorated, and a countermeasure method to be performed in the case where deterioration of media data is detected.

Figure 2:
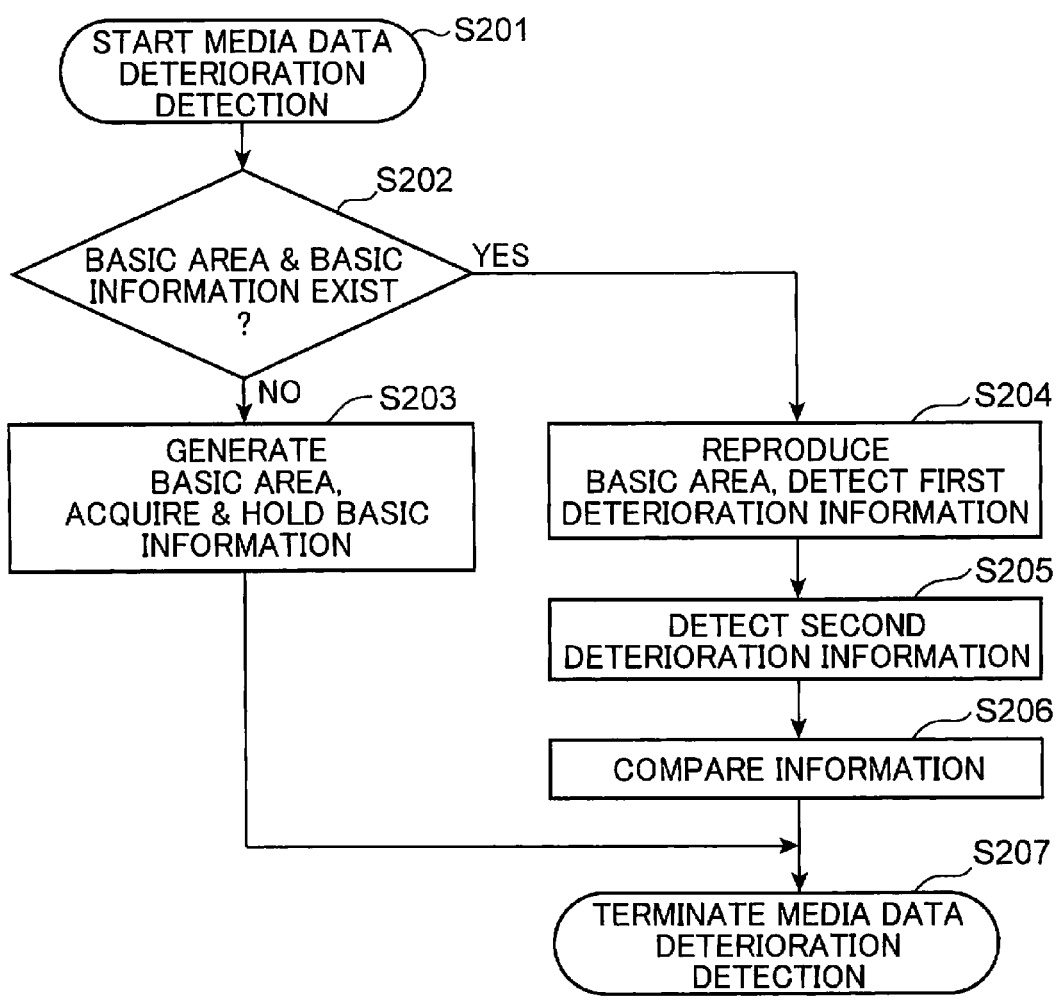
FIG. 2 is a diagram showing an example of a flowchart for detecting media data deterioration in the embodiment of the invention.

Firstly, a sequence of data deterioration detection is described referring to FIG. 2.

FIG. 2 is a flowchart showing a sequence of detecting media data deterioration to be performed by the deterioration detection processor 110 in the optical disc drive device 1 according to the embodiment of the invention.

The following pieces of information (a), (b), and (c) representing signal qualities are used for detecting media data deterioration.

(a) Information representing a signal quality to be obtained by recording and reproducing data in an area (corresponding to an example of a first area) of the optical disc 2 at the time of start of using the optical disc 2, or at the time of start of using another optical disc drive device 1 in the case the optical disc drive device 1 is replaced by the another one due to e.g. disorder of the optical disc drive device 1. Hereinafter, this information is called as basic information.

The basic information is acquired by the basic information detector 112.

(b) Information representing a signal quality to be obtained by reproducing the area from which the basic information is acquired, after a lapse of a predetermined time period from a time when the basic information was acquired. Hereinafter, this information is called as first comparison information.

The first comparison information is acquired by the first comparison information detector 113.

(c) Information representing a signal quality to be obtained by recording and reproducing data to and from an area (corresponding to an example of a second area) different from the area, from which the basic information is acquired, after a lapse of a predetermined time period from a time when the basic information was acquired. Hereinafter, this information is called as second comparison information.

The second comparison information is acquired by the second comparison information detector 114.

Here, information representing a signal quality includes:

information indicating a signal quality such as a modulation degree, beta, jitter, Carrier to Noise ratio (C/N), Signal to Noise ratio (SIN), a bit error rate, a symbol error rate, or an index indicating a signal quality having a correlation with an error rate of a binarization result to be obtained by using a Partial Response Maximum Likelihood (PRML) signal processing system;

address information indicating the address of each recorded area; and information of an amount of recorded data.

In other words, the information representing a signal quality is an index for use in determining deterioration, with use of a Radio Frequency signal.

Here, as a concrete example of information representing a signal quality, an index representing a signal quality to be obtained by using the PRML signal processing system is described referring to FIGS. 3 through 6.

Figure 3:
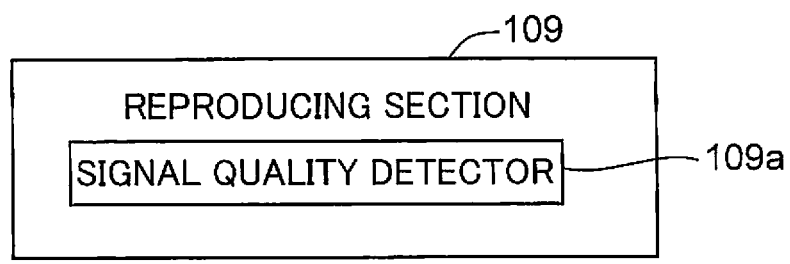
FIG. 3 is a diagram showing an example of a configuration of a reproducing section in the embodiment of the invention.

FIG. 3 is a diagram showing a configuration example of the reproducing section 109 shown in FIG. 1. The reproducing section 109 is further provided with a signal quality detector 109a for detecting a signal quality.

Figure 4:
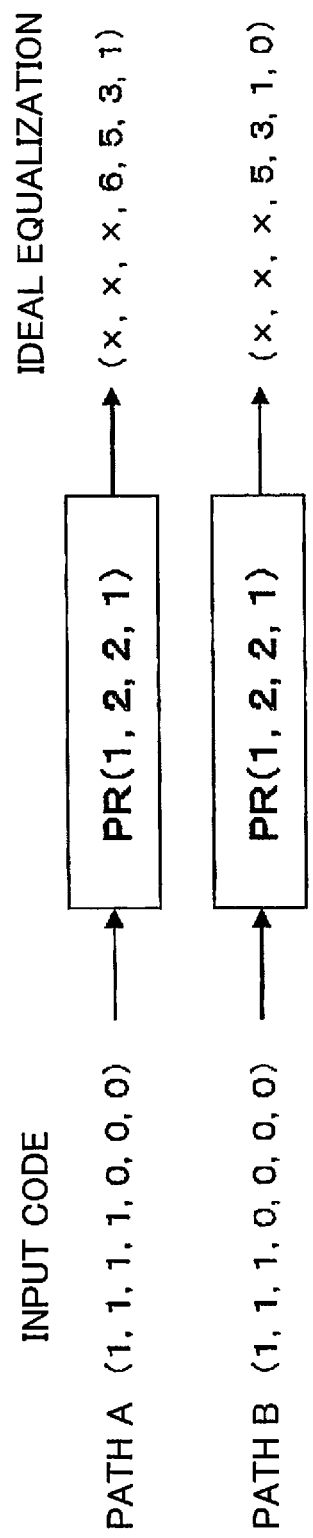
FIG. 4 is an explanatory diagram of PR equalization in the case where an PRML signal processing system is employed.
Figure 5:
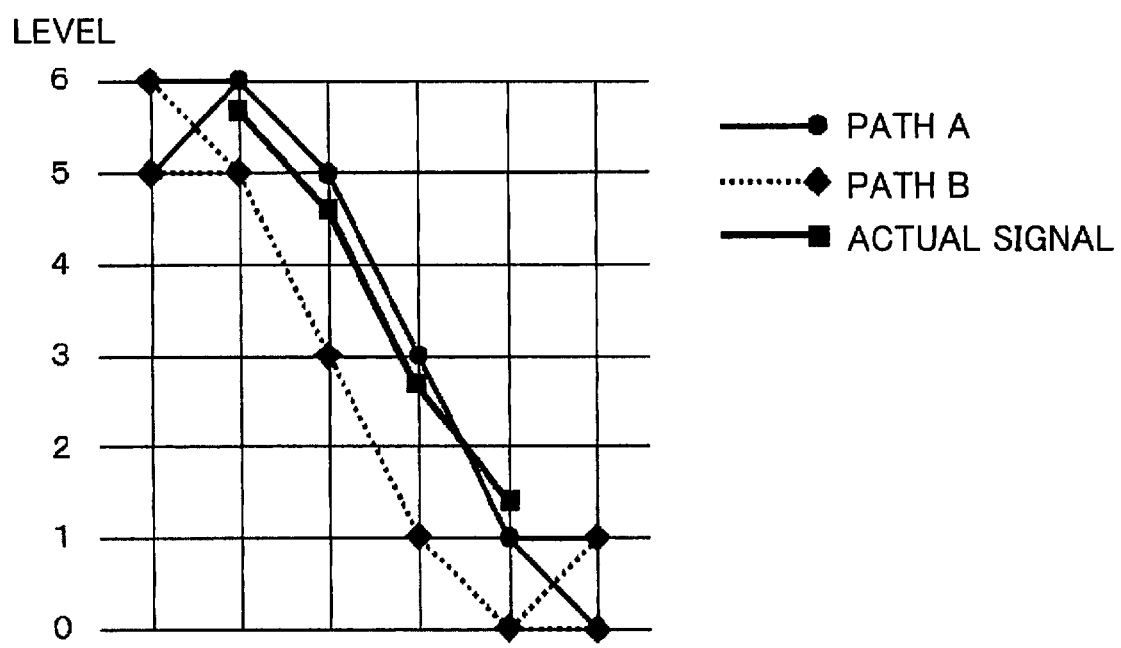
FIG. 5 is an explanatory diagram of maximum-likelihood decoding in the case where the PRML signal processing system is employed.

Next, PR equalization and maximum-likelihood decoding to be performed in the case where the PRML signal processing system is employed are described referring to FIG. 4 and FIG. 5. Here, description is made based on the case that the encoding system is (1, 7) Run Length Limited encoding (RLL), and the PR system is PR (1, 2, 2, 1) system, which are employed in a blu-ray disc.

In the case where the encoding system is (1, 7) RLL, and the PR system is PR (1, 2, 2, 1) system, an ideal equalization signal is a seven-digit signal (0, 1, 2, 3, 4, 5, 6), and the relationship between an input code and ideal equalization is as shown in FIG. 4. The path A is a case, in which the input code is (1, 1, 1, 1, 0, 0, 0), and the path B is a case, in which the input code is (1, 1, 1, 0, 0, 0, 0, 0). In the case where each of the input codes is subjected to equalization by PR (1, 2, 2, 1) system, the ideal equalization result of the path A is (x, x, x, 6, 5, 3, 1), and the ideal equalization result of the path B is (x, x, x, 5, 3, 1, 0).

Next, FIG. 5 shows an aspect of maximum-likelihood decoding. The path A and the path B are signal sequences, in the case where the input codes are subjected to ideal equalization shown in FIG. 4. Further, here, an actual signal is represented by summation of an ideal signal and noise, and a path which is closer to the actual signal is determined between the path A and the path B. Here, the actual signal is represented by (x, x, x, 5.8, 4.7, 2.7, 1.2). And, maximum-likelihood decoding is obtained by reversing the code corresponding to the actual signal.

In the case of FIG. 5, calculating a Euclidian distance $P_A$ between the actual signal and the path A, and calculating a Euclidian distance $P_B$ between the actual signal and the path B are expressed as follows.

The Euclidian distance $P_A$ is:

$$P_A = (6.0-5.8)^2 + (5.0-4.7)^2 + (3.0-2.7)^2 + (1.0-1.2)^2 = 0.26$$

The Euclidian distance $P_B$ is:

$$P_B = (5.0-5.8)^2 + (3.0-4.7)^2 + (1.0-2.7)^2 + (0.0-1.2)^2 = 7.83$$

In this case, when the Euclidian distance $P_A$ is compared with the Euclidian distance $P_B$, the Euclidian distance $P_A$ is smaller. Accordingly, it is possible to determine that the path A is a likelihood path. Therefore, the signal sequence (1, 1, 1, 1, 0, 0, 0) is obtained as maximum-likelihood decoding, using the code corresponding to the path A.

In the foregoing description, maximum-likelihood decoding is performed, assuming that the actual signal is represented by the path A. based on a computation result of Euclidian distances. Here, the basic idea about the signal quality to be obtained by using the PRML signal processing is based on with what degree of certainty, the actual signal is regarded as the path A (or the path B).

For instance, if $P_A < P_B$, it is possible to select the path A with certainty; and if $P_A > P_B$, it is possible to select the path B with certainty. $(P_A - P_B)$ is used as an index representing a degree of certainty in selecting a path. In other words, if $(P_A - P_B)$ is zero, the degree of certainty in selecting a path between the path A and the path B is fifty-fifty, and the path selection is ascertained if the comparison result is larger or smaller than a certain value. In the case of FIG. 5, since $P_A - P_B = -7.57$, it can be said that the degree of certainty in selecting the path A is high.

Figure 6A:
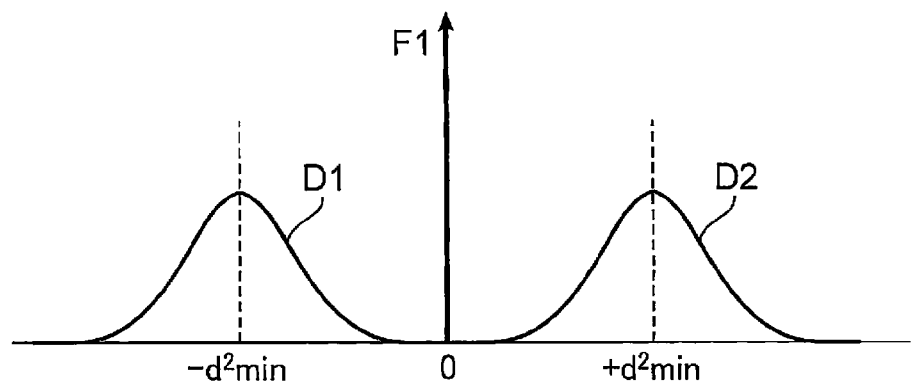
FIGS. 6A and 6B are diagrams for detecting a signal quality in the case where the PRML signal processing system is employed.

Here, assuming that white noise is added to the actual signal, the histogram regarding $(P_A - P_B)$ i.e. the frequency F1 of $(P_A - P_B)$ is the sum of two normal distributions respectively corresponding to the plus side and the minus side of $d^2min$ (least Euclidian distance), which is a Euclidian distance between the path A and the path B, as shown in FIG. 6A. In FIG. 6A, the normal distribution D1 on the minus side represents a case, in which selecting the path A is a correct answer, and the normal distribution D2 on the plus side represents a case, in which selecting the path B is a correct answer. In the case of FIG. 5, the least Euclidian distance $d^2min$ is expressed as follows.

$$d^2min = (6.0-5.0)^2 + (5.0-3.0)^2 + (3.0-1.0)^2 + (1.0-0.0)^2 = 10$$

Figure 6B:
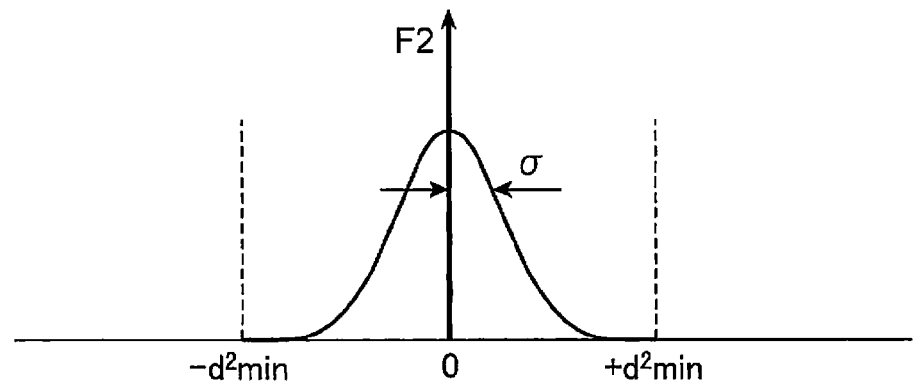

It is, however, difficult to handle the above computation result as it is in obtaining a signal quality. Therefore, as shown in FIG. 6B, the absolute value of $P_A - P_B$ is obtained, and a distribution in which the peak is shifted by $d^2min$ is obtained as a frequency F2 of $|P_A - P_B| - d^2min$. Then, a standard deviation σ is obtained from the distribution, the distribution is normalized with use of the standard deviation σ, and the normalized distribution is obtained as information representing a signal quality to be obtained by using the PRML signal processing.

The above description is an example of a method for obtaining information representing a signal quality to be obtained by using the PRML signal processing. The invention is not limited to the above. Alternatively, the information may be information representing a signal quality to be obtained by using another computation method. Further, the signal quality detector 109a may have the functions of detecting the above-described modulation degree, beta, jitter, C/N, S/N, the bit error rate, the symbol error rate and the like; and these information may be used as information representing a signal quality. Further, multiple information representing a signal quality may be combined to use as information representing a signal quality.

Referring back to FIG. 2, firstly, the deterioration detection processor 110 starts detecting media data deterioration (Step S201). Here, detecting media data deterioration may be started at any timing by the user, or the deterioration detection processor 110 may detect media data deterioration at a predetermined timing in accordance with information such as data storage characteristics of the optical disc 2. For instance, the deterioration detection processor 110 may start detecting media data deterioration, each time user data is recorded, or at an interval of about several hours, or at an interval of about several years such as every one year or every three years, or at an interval of about several ten years such as every ten years or every thirty years.

For instance, some of the optical discs assured of a long-term storage life may have a storage life of about thirty years to fifty years. In this case, however, the storage is made based on the premise that the optical discs are stored in an environment stipulated by the manufacturer such as a condition that the temperature is 30° C. and the humidity is 85%, or a condition that the temperature is 25° C. and the humidity is 85%. Accordingly, in the case where data is recorded in optical discs and these optical discs are stored in a predetermined environment, it is not necessary to frequently detect media data deterioration. Media data deterioration may be detected after the storage life has expired (e.g. 50 years later after data is recorded, in the case of discs assured of a storage life of fifty years).

However, it is more desirable to detect media data deterioration at an interval shorter than the storage life, in view of a likelihood that an actually storable time may vary depending on a change in the storage environment or depending on data recorded conditions. For instance, by detecting media data deterioration at an interval of a time period corresponding to one-half of the storage life (in the case of media assured of fifty years as a storage life, every twenty-five years), it is possible to detect data deterioration before data is unreadable.

However, in the case where media data deterioration is detected at a time interval corresponding to one-half of the storage life, if the storage environment changes after media data deterioration is detected for the first time, it is highly likely that data may be unredable when media data deterioration is detected for the second time. In view of the above, detecting media data deterioration at a time interval corresponding to one severalth of the storage life is further advantageous in enhancing the reliability.

For instance, in the case where media data deterioration is detected at a time interval corresponding to about one-fourth to one-tenth of the storage life (in the case of media assured of fifty years as a storage life, about every twelve years to five years), it is possible to sufficiently detect data deterioration before data loss, as far as the storage environment is not drastically changed. Further, since the frequency of detecting media data deterioration is low, it is easy to handle the media.

Here, the interval of detecting media data deterioration differs depending on the specifications of products or the levels of reliability required by the users. In view of the above, the interval is not limited to the above, but may be shortened.

Further, in the case where media are stored in an environment different from the storage environment stipulated by the manufacturer, the storage life changes. For instance, if the temperature and the humidity increase, the storage life is shortened. In view of the above, in the case where the optical disc drive device 1 is used or the optical disc 2 is stored in an environment different from the environment stipulated by the manufacturer, a storage life in an actual environment may be obtained in advance, and a time interval for detecting media data deterioration may be determined by the aforementioned method, after the obtained time is set as the storage life. Here, a data storable time in an actual environment may be obtained by an acceleration test for determining the media life, or may be supplied from the manufacturer.

In other words, the deterioration detection processor 110 may determine a time interval T1 for detecting media data deterioration, based on a storage life T0 which is set for the optical disc 2. Then, the deterioration detection processor 110 may acquire the first comparison information and the second comparison information, after a lapse of the determined time interval T1 from a time when information, based on which the basic information is acquired, was recorded. The relationship between the storage life T0 and the time interval T1 may be T1=T0, or T1=T0/2, or T1=T0/4 through T0/10. Further, the storage life T0 may be a predetermined time with respect to the optical disc 2, or may be obtained by e.g. an acceleration test.

Then, the deterioration detection processor 110 checks whether a basic area and basic information are stored (Step S202). The case that basic information is not stored means a case that the optical disc 2 is in an unused state, or a case that the optical disc 2 is used but the optical disc drive device 1 is replaced by another one due to e.g. disorder of the optical disc drive device 1. In the above case (NO in Step S202), data is recorded in a predetermined basic area of the optical disc 2, and basic information is acquired by reproducing the recorded data (Step S203). The basic information is acquired for the first time in Step S203. Accordingly, the media data deterioration detection is terminated, without implementing the media data deterioration detection (Step S207).

Here, even in the case where the optical disc drive device 1 is replaced by another one, substantially the same processing as in the case where the optical disc 2 is in an unused state is performed for the following reason. Specifically, the optical disc 2 may have a basic area, from which the basic information has been acquired at the time of using the optical disc drive device 1 before the replacement. Accordingly, the basic information may also be stored in the optical disc 2. However, in the case where the reproducing performances differ between the optical disc drive device 1 before the replacement and the optical disc drive device 1 after the replacement, data deterioration may not be properly detected by the optical disc drive device 1 after the replacement.

For instance, even in the case where media data is deteriorated, when the reproducing performance of the optical disc drive device 1 after the replacement is superior to the reproducing performance of the optical disc drive device 1 before the replacement, it may be detected that the first comparison information acquired by the optical disc drive device 1 after the replacement has a better signal quality than that represented by the basic information acquired by the optical disc drive device 1 before the replacement, or has the same signal quality as that represented by the basic information acquired by the optical disc drive device 1 before the replacement.

On the other hand, in the case where there exists the basic information (YES in Step S202), the first comparison information is detected by reproducing the basic area that has been used at the time of detecting the basic information (Step S204).

Then, the second comparison information is detected by recording and reproducing data with respect to an area different from the basic area (Step S205). After it is determined whether media data is deteriorated by comparing the signal qualities of the basic information, the first comparison information, and the second comparison information (Step S206), the media data deterioration detection is terminated (Step S207). Here, Step S206 corresponds to the processing to be performed by the deterioration determiner 115.

Here, the media data deterioration detection sequence in the embodiment is not limited to the sequence shown by the flowchart of FIG. 2. As far as substantially the same effect as described above can be obtained, any configuration is applicable. For instance, in the embodiment, the second comparison information is acquired after the first comparison information is acquired. Alternatively, the second comparison information may be acquired before the first comparison information is acquired.

Figure 7:
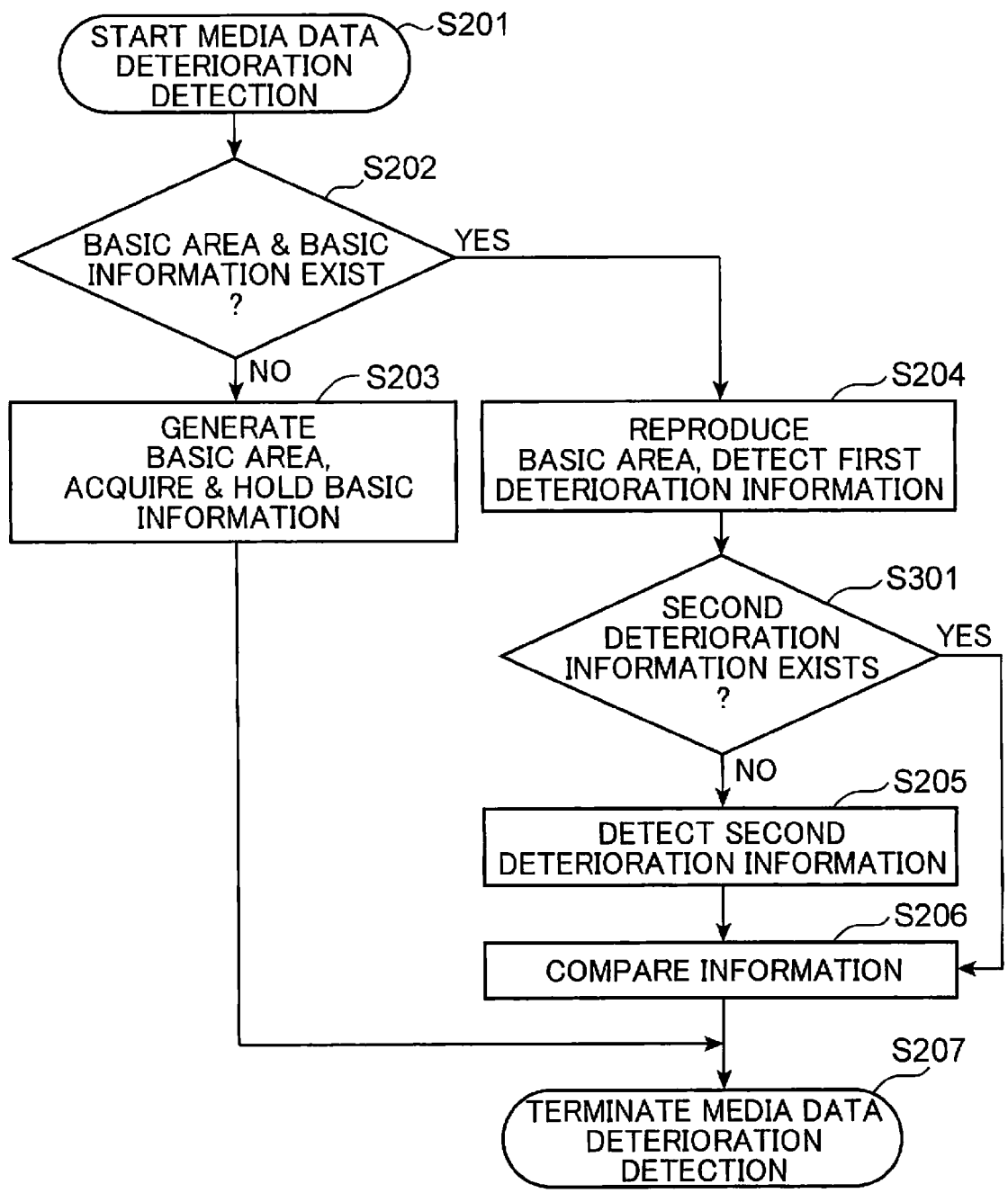
FIG. 7 is a diagram showing another example of the flowchart for detecting media data deterioration in the embodiment of the invention.

Further, media data deterioration detection may be implemented by the sequence shown in the flowchart of FIG. 7. In the following, the same reference signs are used for substantially the same processing as described referring to FIG. 2, and repeated description of the same processing is omitted. After the first comparison information is detected (Step S204), it is checked whether there exists the second comparison information (Step S301). Here, in the case where there does not exist the second comparison information, data recording and reproducing is performed for detecting the second comparison information (Step S205). In the case where there exists the second comparison information, the signal qualities of the basic information, the first comparison information, and the second comparison information are compared with each other for determining whether media data is deteriorated (Step S206).

Here, it is possible to acquire information representing a signal quality in recording and reproducing user data, before media data deterioration detection is started, and to use the acquired information as the second comparison information.

Further, Step S301 of checking whether there exists the second comparison information may be performed before the first comparison information is detected. In the modification, the deterioration detection processor 110 also has a function of holding the second comparison information for holding the second comparison information. In the case where this sequence is adopted, it is possible to select whether data is newly recorded by presence or absence of the second comparison information. Thus, the modification is advantageous in eliminating the need of detecting the second comparison information by newly recording and reproducing data, in the case where a recording operation is performed before media data deterioration detection is started.

As described above, the time period from the time the basic information is detected until the time a signal quality of the first comparison information is acquired, and the time period from the time the basic information is detected until the time the second comparison information is detected may be the same as each other, or may be different from each other.

In the following, an area structure of a general optical disc is described.

Figure 8:
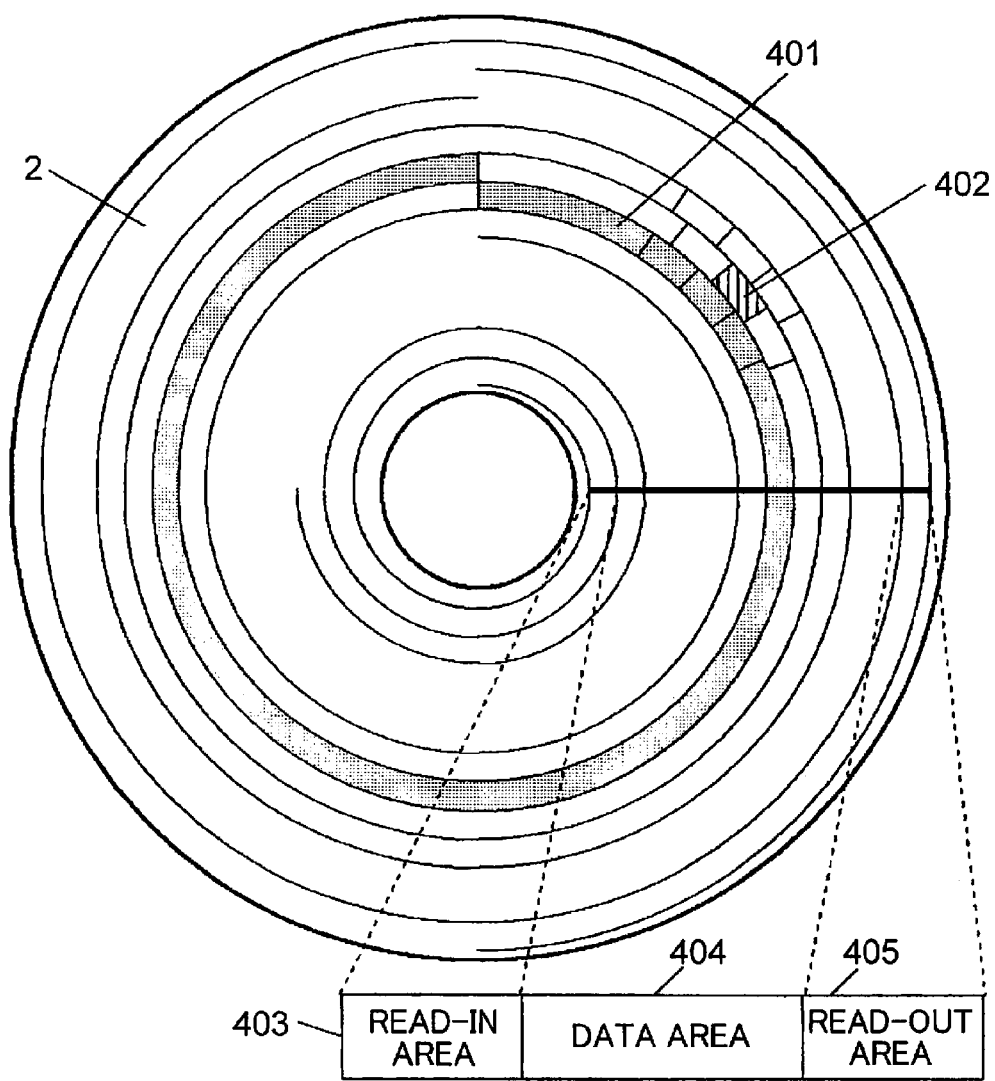
FIG. 8 is a diagram showing an area structure of an optical disc.

FIG. 8 is a diagram showing an area configuration of a general optical disc. The disc-shaped optical disc 2 is formed with multitudes of tracks 401 in spirals. A block 402 is a unit of error correction, and is a minimum unit with which a recording operation and a reproducing operation are performed. Further, an area in a certain recording layer of the optical disc 2 is roughly divided into a read-in area 403, a data area 404, and a read-out area 405. User data is recorded/reproduced with respect to the data area 404. The read-in area 403 and the read-out area 405 also serve as margins with which the optical pickup 103 can follow the tracks even if the optical pickup 103 runs over the tracks.

Figure 9:
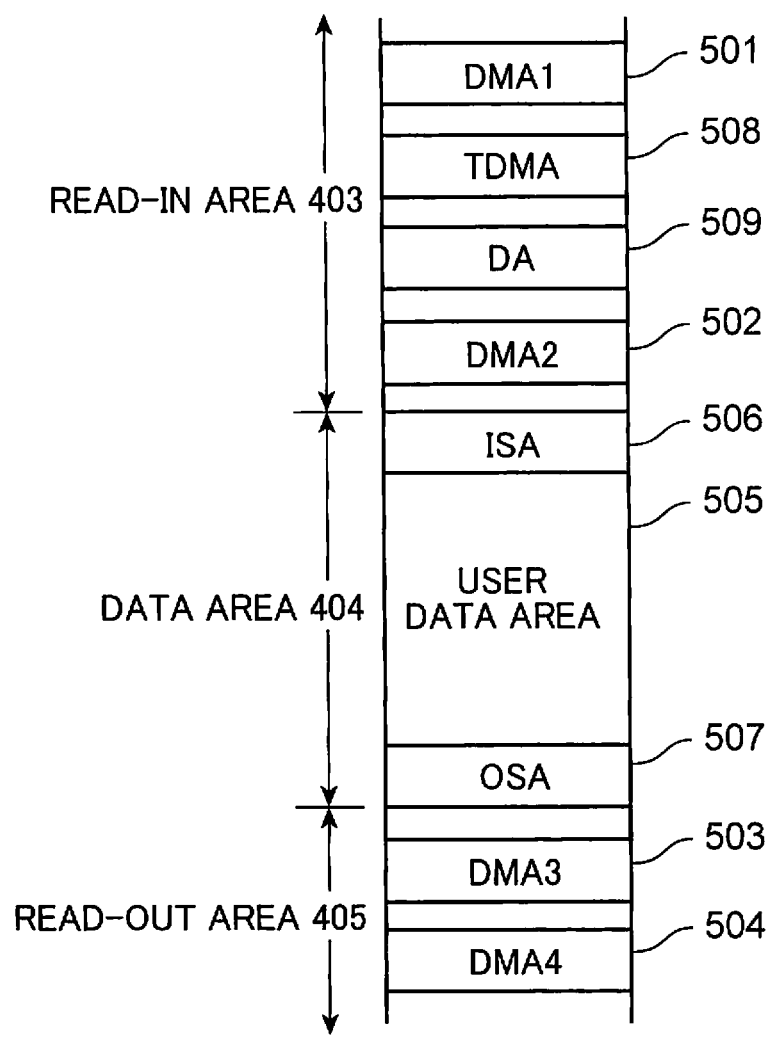
FIG. 9 is a diagram showing details of the area structure of a certain recording layer in a recordable optical disc.

FIG. 9 is a diagram showing details of an area structure of a certain recording layer of a recordable optical disc.

The data area 404 is constituted of a user data area 505 with respect to which user data is recorded/reproduced, and an ISA (Inner Spare Area) 506 provided on the inner periphery of the optical disc 2 and an OSA (Outer Spare Area) 507 provided on the outer periphery of the optical disc 2, both of which serve as spare areas prepared in advance as blocks (hereinafter, called as replacement blocks) to be used in place of defective blocks in the user data area 505.

The read-in area 403 and the read-out area 405 are provided with a management information area (DMA: Disc Management Area, or Defect Management Area), which is an area into which management information such as information relating to defective blocks in the optical disc 2 is written. Specifically, the read-in area 403 is provided with DMA1 and DMA2, and the read-out area 405 is provided with DMA3 and DMA4. The DMA1 through DMA4 are areas respectively disposed at predetermined positions. In a DMA, there are recording management information as represented by a DFL (Defect List) which is defect information, recording management information such as SRRI (Sequential Recording Range Information) provided with information relating to tracks in the user data area 505, a DDS (Disc Definition Structure) provided with an area structure of the data area 404 and position information in which a DFL is recorded, and the like. These are generically called as management information (DMS: Disc Management Structure or Defect Management Structure). The size of the management information (DMS) to be recorded in a DMA is variable, because the management information is provided with a DFL which is variable depending on e.g. the number of defective blocks.

Same information is multiple recorded in each of DMA1 through DMA4. This is a countermeasure against a case where a defect has occurred in one of the DMA1 through DMA4. Even if there is one DMA from which the information is not accurately reproduced, it is possible to acquire the management information as far as there is at least one DMA from which the information can be accurately reproduced. In this way, management information is protected by providing redundancy in the management information that is indispensible in recording/reproducing with respect to the optical disc 2.

In the case of a rewritable optical disc, updating the management information is implemented by overwriting in a DMA. In the case of a recordable optical disc, however, a recording operation can be performed only one time. Therefore, it is impossible to overwrite and record management information at a specific position of a DMA like a rewritable optical disc. In view of the above, in the case of a recordable optical disc, the optical disc is provided with TDMA (Temporary Disc Management Areas) 508, which is used to transiently record latest management information. In other words, there exists latest management information at a recorded end position of the TDMA 508.

A DA (Drive Area) 509 is an area in the optical disc, in which information is optionally recordable. For instance, it is possible to record, in the DA 509, various information necessary for recording/reproducing with use of the optical disc drive device 1, such as parameter information (recording adjustment results) relating to an optical disc drive that performs a recording operation.

FIG. 8 and FIG. 9 show an example of the area configuration of the optical disc 2 as a recording medium. The invention is not limited to the above. Further, the optical disc 2 may be any disc such as a recordable optical disc or a rewritable optical disc.

Further, it is possible to use the area of the user data recorded at a predetermined position of the data area 404, as an area for acquiring the basic information. Alternatively, it is possible to acquire the basic information by securing a predetermined area in the data area 404 and by recording and reproducing data other than the user data with respect to the predetermined area. Further, it is possible to use, as an area for acquiring the basic information, the areas such as the DMA1 through DMA4, the TDMA 508, the DA 509, and the like. Further, it is possible to use, as an area for acquiring the second comparison information, the area of the user data recorded at a predetermined position of the data area 404. Further alternatively, it is possible to acquire the second comparison information by securing a predetermined area in the data area 404 and by recording and reproducing data other than the user data with respect to the predetermined area.

More specifically, in the case where a recording operation is performed with respect to a recordable optical disc for the first time, management information is recorded with respect to the TDMA 508 before a recording operation into the user data area is performed (generally, this processing is also called as initialization). The management information recorded in the above operation is read out, each time the optical disc drive device 1 is activated for recording/reproducing with respect to the optical disc. Accordingly, use of the TDMA 508 as an area for acquiring the basic information enables to acquire the basic information or the first comparison information in association with an ordinary operation of the optical disc drive device 1, without additionally performing a recording and reproducing processing for acquiring the basic information or the first comparison information. Thus, the above configuration is also advantageous in enhancing the performance and in reducing the area used.

In the case where there is no more recordable capacity in a recordable optical disc, or in the case where it is determined that the user has no intention to record any more in a recordable optical disc, it is an ordinary practice that the user performs finalization and sets the recordable optical disc as a reproduction-only medium. However, in view of the necessity of performing a recording operation for acquiring the second comparison information, in this embodiment, the finalization is not performed. It should be noted that, even in the case where the finalization is performed, there is no problem involved in reproduction of recorded user data, even if a recording operation is performed with respect to the TDMA 508, or with respect to the ISA 508 or the OSA 507 as a spare area. Therefore, it is possible to perform the finalization.

More specifically, even in the case where it is impossible to record user data any more, in other words, even in the case where the remaining capacity of the user data area 505 is insufficient, and the user wishes to use the optical disc as a reproduction-only medium, it is highly likely that there remains an unused and accordingly recordable area in the TDMA 508 for recording management information, or in the spare areas (ISA 506, OSA 507) in the data area 404 for replacement recording for defective blocks. It becomes possible to monitor deterioration of user data for a long period by using such an area as an area for newly recording data in order to acquire the second comparison information.

Further, it is possible to secure an area sufficient for recording the second comparison information in the optical disc 2, even in the case where there is no or insufficient area for the user to record data.

Further, in an optical disc having plural recording layers, the characteristics differ among the recording layers. In view of the above, it is desirable to secure an area for acquiring the second comparison information in the same recording layer as in the area from which the basic information is acquired.

Further, the characteristics differ between an inner periphery and an outer periphery of an optical disc, even if the recording layer is the same. In view of the above, it is desirable to form an area from which the second comparison information is acquired, in the vicinity of an area from which the basic information is acquired. Specifically, it is often the case that the characteristics of an area near an outermost periphery (an outer periphery where the radius is larger than 55 mm) of media differ from those of the other areas. In view of the above, in the case where an area from which the basic information is acquired lies in the outermost periphery (an outer periphery where the radius is larger than 55 mm), it is further desirable to set an area, from which the second comparison information is acquired, in the outermost periphery.

Further, in the case where an area is managed by a positional relationship relative to an area from which the basic information is acquired, the area from which the second comparison information is acquired may be set within 1 mm away from the area from which the basic information is acquired. In this configuration, it is possible to determine the area, from which the second comparison information is acquired, in an area where there is no large characteristic difference, regardless of whether the area from which the basic information is acquired is in the vicinity of the outermost periphery or is an area other than the outermost periphery.

Further, a characteristic difference is small in the areas of the optical disc other than the area near the outermost periphery of the optical disc. In view of the above, in the case where the area from which the basic information is acquired is in an area (an inner periphery where the radius is smaller than 55 mm) other than the outermost periphery, the area from which the second comparison information is acquired may be at any radial position, as far as the area from which the second comparison information is acquired lies in the area other than the outermost periphery. It should be noted, however, that a characteristic difference in one recording layer varies among the types of optical discs or among the manufacturers of optical discs. In view of the above, it is possible to obtain the characteristics of the optical disc in advance at each radial position, and to determine an area from which the second comparison information is acquired with respect to an area from which the basic information is acquired.

Specifically, in the case where the optical disc 2 is provided with plural recording layers, the deterioration detection processor 110 may set, in the same recording layer, a basic area (corresponding to an example of a first area, called here as an area R1) in which information for acquiring the basic information is recorded, and an area (corresponding to an example of a second area, called here as an area R2) different from the basic area, in which information for acquiring the second comparison information is recorded. Further, the deterioration detection processor 110 may set both of the areas R1 and R2 in the outermost periphery (an outer periphery where the radius is larger than 55 mm) of the optical disc 2. Further, the deterioration detection processor 110 may set the areas R1 and R2 at such positions that the areas R1 and R2 are away from each other by the distance of 1 mm or less. Further, in the case where the area R1 is set in an area other than the outermost periphery, the deterioration detection processor 110 may set the area R2 at any position other than the outermost periphery. Further, the characteristics of the optical disc 2 may be obtained in advance at each radial position, and the deterioration detection processor 110 may set the areas R1 and R2 in a radial region where the characteristics are substantially the same.

As described above, the optical disc drive device 1 (an information recording and reproducing device) according to the embodiment is provided with the recording section 108 that records information in the optical disc 2 (a recording medium), the reproducing section 109 that reproduces the information recorded in the optical disc 2, and the deterioration detection processor 110 that detects deterioration of the signal quality of the information recorded in the optical disc 2. The deterioration detection processor 110 detects the basic information, with use of the reproducing section 109, from the information recorded by the recording section 108. The deterioration detection processor 110 detects the first comparison information by reproducing the information in the area from which the basic information is detected, with use of the reproducing section 109, after a lapse of a predetermined time period from a time when the basic information was detected. The deterioration detection processor 110 detects the second comparison information by reproducing, with use of the reproducing section 109, the information recorded by the recording section 108 in an area different from the area from which the basic information was detected. The deterioration detection processor 110 determines deterioration of the signal quality by combining the basic information, the first comparison information, and the second comparison information.

With the above configuration, the deterioration detection processor 110 detects deterioration of the signal quality of the information recorded in the optical disc 2, with use of the basic information, the first comparison information, and the second comparison information. This enables to detect deterioration of the information recorded in the optical disc 2, without using a reference recording medium or a reference information recording and reproducing device. Further, the above configuration is also advantageous in eliminating the need of storing the optical disc 2 in e.g. a low-temperature warehouse. Further, the above configuration is also advantageous in eliminating the need of periodically checking the characteristics of the optical disc 2 by a reference machine.

Here, it is necessary to store the basic information for a predetermined period and to compare the basic information with the first comparison information or with the second comparison information in order to detect media data deterioration. The storage period differs among the data storage characteristics of the optical discs 2 or among the settings of a drive system. In the case where the storage period is relatively long, it is necessary to store the basic information in the unit of several hours to several ten years. Here, it is possible to store the basic information for a long period by recording the basic information in a predetermined area of the optical disc 2. Thus, the deterioration detection processor 110 also has a processing function of storing the basic information.

In the following, an example regarding in which area of the optical disc 2, a recording operation is performed is described.

As described referring to FIG. 9, various areas are formed in the optical disc 2. For instance, the DA 509 is an area in which information is optionally recordable, among the areas other than the data area 404. Accordingly, it is possible to record the basic information in the DA 509. Further, the area for recording the basic information is not limited to the DA 509, but an area in the optical disc 2 may be secured and used as the area for recording the basic information. For instance, it is possible to use a part of the user data area 505 as an area for recording the basic information. Further, the basic information may be stored in association with the date or time information representing a time when the information representing the signal quality of the basic information was acquired (in other words, a time when the information was recorded for acquiring the basic information). With this configuration, it becomes possible to determine media data deterioration, taking into consideration of a lapse of a time period, in addition to the information representing the signal quality.

Further, in the case where the sequence of the flowchart of FIG. 7 is adopted, it is necessary to store also the second comparison information for a predetermined period. In this case, since a long-term storage is less likely to be needed, it is desirable to store the second comparison information in the memory 105. It should be noted, however, that in the case where a long-term storage is required, it is possible to store the second comparison information for a long period by recording the second comparison information in the optical disc 2 as in the case of the basic information as described above.

Further, since it is necessary to store also the first comparison information, although the storage period is short, it is desirable to store the first comparison information in e.g. the memory 105.

Specifically, the optical disc drive device 1 according to the embodiment may be configured to record the basic information detected by the deterioration detection processor 110 in a specific area of the optical disc 2, with use of the recording section 108.

Figure 10:
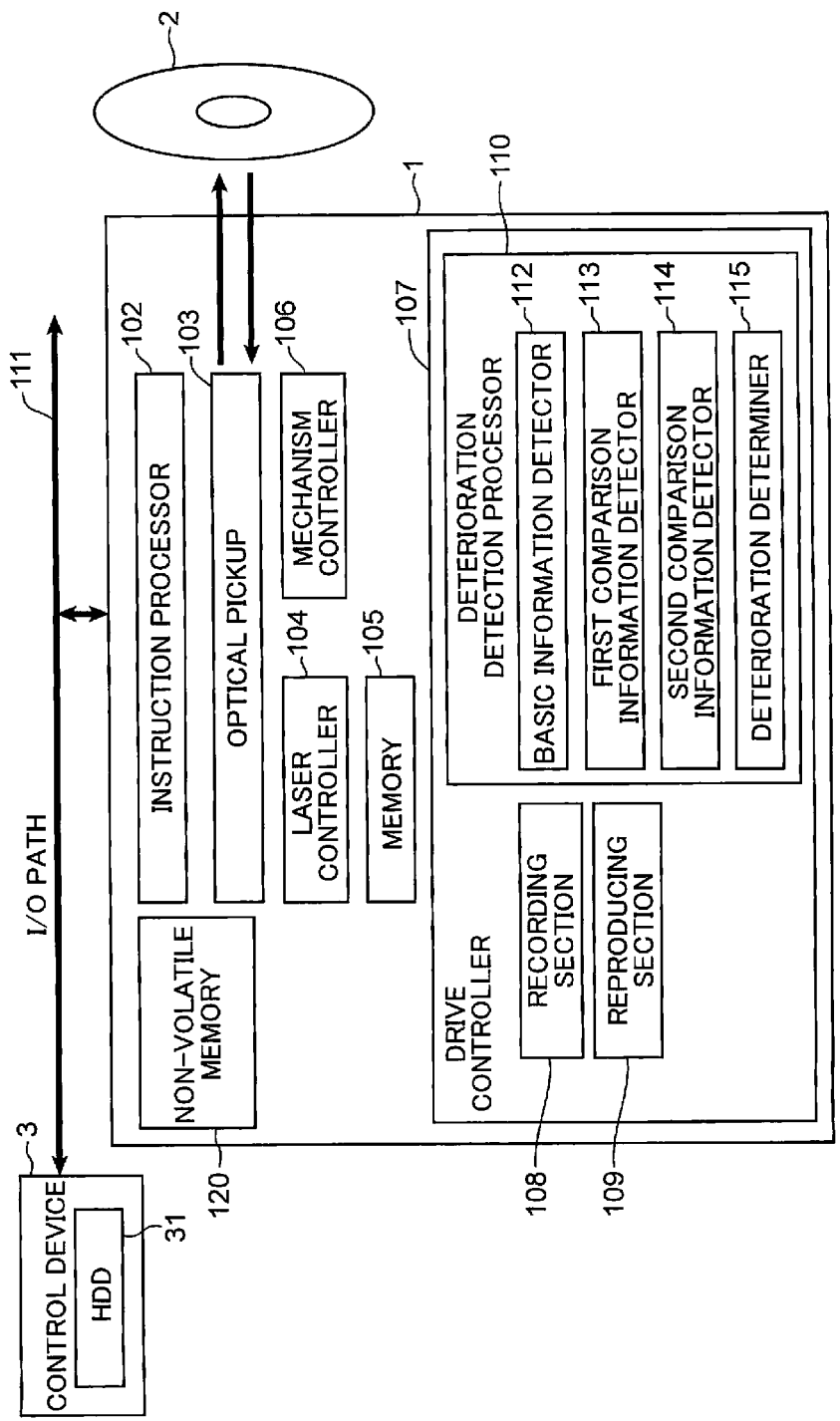
FIG. 10 is a diagram showing another configuration example of the optical disc drive device according to the embodiment of the invention.
Figure 11:
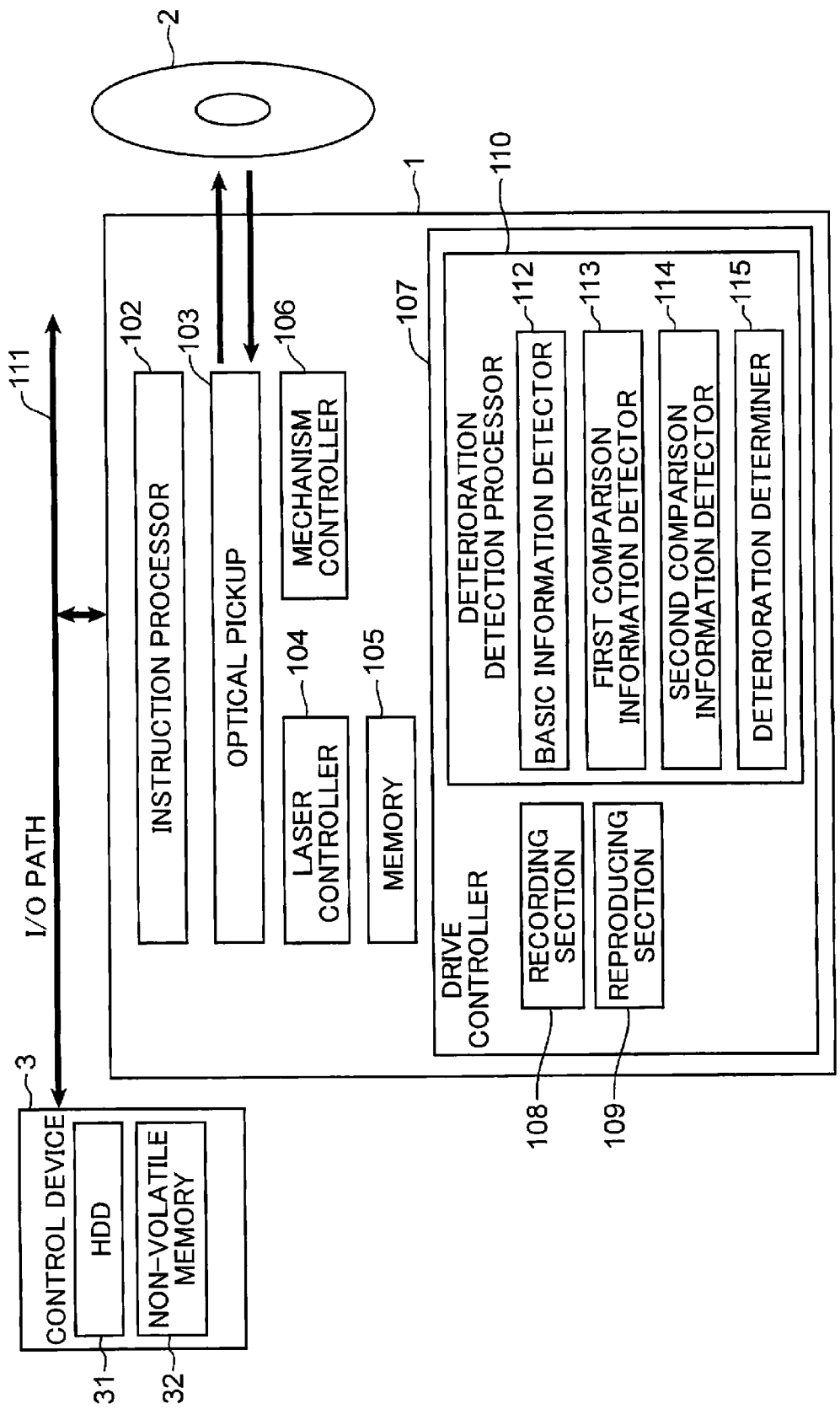
FIG. 11 is a diagram showing another configuration example of a control device in the embodiment of the invention.

Further, as shown in FIG. 10, the optical disc drive device 1 may be further provided with an information recording medium such as a non-volatile memory 120 for recording the basic information. Further, the instruction processor 102 may record the basic information in a hard disk drive (HDD) 31 (see FIG. 1) provided in the master control device 3 to be connected via the I/O path 111. Further alternatively, as shown in FIG. 11, the control device 3 may be provided with an information recording medium such as a non-volatile memory 32, and the deterioration detection processor 110 may record the basic information in the non-volatile memory 32 via the instruction processor 102. In this case, it is not necessary to record the basic information in the optical disc 2, which makes it possible to prevent from lowering the operation performance of the drive system.

Further, in the case where the sequence of the flowchart of FIG. 7 is adopted, the optical disc drive device 1 may be further provided with an information recording medium such as the non-volatile memory 120 (see FIG. 10) for recording the second comparison information, as in the case of the basic information as described above. Further, the deterioration detection processor 110 may record the second comparison information, via the instruction processor 102, in an information recording medium such as the hard disk drive (HDD) 31 (see FIG. 1) or the non-volatile memory 32 (see FIG. 11) provided in the master control device 3 to be connected via the I/O path 111.

Specifically, the optical disc drive device 1 according to the embodiment may be further provided with the instruction processor 102 (corresponding to an example of an output section) for transmitting and recording signal quality information to an external storage section such as the HDD 31 or the non-volatile memory 32, and may store the basic information detected by the deterioration detection processor 110 in the external storage section via the instruction processor 102.

Next, there is described an example of a method for determining whether media data is deteriorated by the deterioration detection processor 110, with use of the basic information, the first comparison information, and the second comparison information.

Hereinafter, in the case where signal qualities are same as each other, the equality sign "=" is used, and in the case where signal qualities differ from each other, the inequality sign "<" or ">" is used. Further, in the case where description is made with use of the inequality signs, to simplify the description, (A) indicates a signal quality the basic information represents, (B) indicates a signal quality the first comparison information represents, and (C) indicates a signal quality the second comparison information represents.

For instance, if (A)=(B), it means that (A) is equal to (B). In other words, it means that the signal quality the basic information represents is equal to the signal quality the first comparison information represents. If (A)<(B), it means that (B) is better than (A). In other words, it means that the signal quality the first comparison information represents is higher than the signal quality the basic information represents. If (A)>(B), it means that (A) is better than (B). In other words, it means that the signal quality the basic information represents is higher than the signal quality the first comparison information represents.

The first condition is a condition: (B)<(C). This is a case, in which a signal quality obtained by newly recording and reproducing data is better than a signal quality to be obtained by performing a reproducing operation after a lapse of a predetermined time period from the time when a recording operation was performed. Here, a state that the signal quality the second comparison information represents is better than the signal quality the first comparison information represents presumably corresponds to a case that the recording performance of media is improved, or a case that the recording performance of the optical disc drive is improved. However, it is usually inconceivable that the recording performance of media or the recording performance of the optical disc drive is improved during storage of the optical disc 2 or usage of the disc or the drive.

Further, in the case where media data deterioration is serious as compared with deterioration of the recording performance of media or the recording performance of the optical disc drive, it may be possible that the condition: (B)<(C) is established. Accordingly, if the condition: (B)<(C) is established, it is possible to determine that at least media data is deteriorated. Further, there is no such large time lag as to cause deterioration between the timing of acquiring the first comparison information and the timing of acquiring the second comparison information. Accordingly, it may be possible to conceive that the reproducing performance of the optical disc drive remains substantially the same. However, it is unknown whether the reproducing performance of the optical disc drive is deteriorated only by the first comparison information and the second comparison information.

Therefore, in the case where the condition: (B)<(C) is established, although one or more of the recording performance of media, the reproducing performance of the optical disc drive, and the recording performance of the optical disc drive may be concurrently deteriorated, it is possible to determine that at least media data is deteriorated.

The second condition is a condition: (A)>(C)>(B). This condition is a condition obtained by adding, to the first condition: (B)<(C), the condition: (B)<(A) and the condition: (C)<(A).

Firstly, the condition: (B)<(A) is described. This is a case, in which the signal quality obtained by reproducing information instantly after recording the information is better than the signal quality to be obtained by reproducing information after a lapse of a predetermined time period from a time when the information was recorded. This condition is established in the case where the media data is deteriorated, or in the case where the reproducing performance of the optical disc drive is deteriorated, or in the case where both of the media data and the reproducing performance of the optical disc drive are deteriorated. Here, since a recording operation is not performed at the time of acquiring the first comparison information, it is unknown whether the recording performance of media and the recording performance of the optical disc drive are deteriorated.

Secondly, the condition: (C)<(A) is described. This is a case, in which the signal quality obtained by recording information and reproducing the recorded information is better than the signal quality to be obtained by recording information and reproducing the recorded information after a lapse of a predetermined time period. This condition is established in the case where one or more of the recording performance of media, the reproducing performance of the optical disc drive, and the recording performance of the optical disc drive are concurrently deteriorated. If (C)<(A), it is unknown whether the media data is deteriorated, because the area in which the basic information is recorded is not reproduced.

Therefore, in the case where the condition: (A)>(C)>(B) is established, although one or more of the recording performance of media, the reproducing performance of the optical disc drive, and the recording performance of the optical disc drive may be concurrently deteriorated, it is possible to determine that at least the media data is deteriorated. It should be noted, as described above, that if (C)<(A), it is unknown whether the media data is deteriorated. In view of the above, the second condition may be (B)<(C) and (B)<(A).

The third condition is a condition: (A)=(C)>(B). This condition is a condition obtained by adding, to the first condition: (B)<(C), the condition: (A)=(C). The condition: (A)=(C) means that a signal quality obtained by recording and reproducing information at a previous time is equal to a signal quality obtained by recording and reproducing information with respect to another area after a lapse of a predetermined time period. Here, a case in which the signal quality the basic information represents is substantially equal to the signal quality the second comparison information represents is only the case in which none of the recording performance of media, the reproducing performance of the optical disc drive, and the recording performance of the optical disc drive is deteriorated.

Therefore, the condition: (A)=(C)>(B) is established only in the case where the media data is deteriorated. Therefore, according to this condition, it becomes possible to more clearly determine that media data is deteriorated.

It should be noted that the deterioration detection processor 110 (deterioration determiner 115) may determine that media data is deteriorated, when one of the above three conditions is established. For instance, the deterioration detection processor 110 (deterioration determiner 115) may only determine whether the first condition: (B)<(C) is satisfied, in other words, whether the condition that the signal quality the second comparison information represents is higher than the signal quality the first comparison information represents is satisfied. In this case, the basic information detector 112 is not necessary. Accordingly, in FIG. 1, the basic information detector 112 may be omitted from the deterioration detection processor 110.

Here, actual signal quality detection may vary due to an influence such as the performance of the optical disc drive device 1. Therefore, if signal qualities are compared with use of detected values as they are, the relationship between the signal qualities of the detected two signals may be displaced from a true relationship, due to an influence of detection variation. In view of the above, preferably, the deterioration detection processor 110 may compare the signal qualities, after reducing an influence of variation, by using an average value obtained by carrying out a measurement multiple times. In this case, it becomes possible to compare the signal qualities, even if a difference between the signal qualities is small.

Specifically, the deterioration detection processor 110 may acquire the basic information, the first comparison information, and the second comparison information by reproducing information multiple times with use of the reproducing section 109, and by using an average value of the reproduction results, in acquiring the basic information, the first comparison information, and the second comparison information.

However, in the actual optical disc drive device 1, in the case where the deterioration detection processor 110 performs signal quality detection multiple times, it takes a certain time for the detection, and accordingly, the performance of the optical disc drive device 1 is lowered. Further, it is necessary to perform a recording operation at multiple recording positions in order for the deterioration detection processor 110 to perform the signal quality detection multiple times. Hence, it becomes necessary to secure a large area in the optical disc 2 for detecting the signal qualities.

In view of the above, in the optical disc drive device 1 requiring a high performance or in the optical disc 2 putting a high priority on a recording capacity, the deterioration detection processor 110 may perform the reproduction of the information for detecting a signal quality only one time, and may compare the signal qualities, not with the detection results of the signal qualities as they are, but allowing a certain margin with respect to the detection results, the margin corresponding to a specified range of variation. In this case, since a variation range is provided to the detection results, it is possible to improve the performance of the optical disc drive device 1, and to reduce the recording capacity required in the optical disc 2, although it is impossible to compare signal qualities if the difference between the signal qualities is small.

Further, since detection variation differs among the performances of the optical disc drive devices 1, it is desirable to measure variations in advance. Specifically, measurement may be performed multiple times with use of an optical disc drive device 1 to be actually used, a standard deviation may be obtained from the measurement results, and a range obtained by multiplying the standard deviation by a predetermined value may be set as a variation range. The variation range may be determined depending on a required performance, but generally, it is sufficient to set a range obtained by triplicating a standard deviation as the variation range.

In the following, a concrete method for comparing signal qualities is described, taking actually into consideration of a variation. For instance, in the case where the signal qualities are detected to be (A)=10% and (B)=12%, let us assume a case in which the variation range is 0.5% (standard deviation× 3=0.5%). In this case, the signal qualities may respectively be (A)=9.5% to 10.5% and (B)=11.5% to 12.5%. Hence, there is no likelihood that the value of (A) and the value of (B) are made equal to each other. Accordingly, the deterioration detection processor 110 determines that (A)>(B). In this example, the numerical value representing a signal quality decreases, as the signal quality is enhanced.

Further, in the case where the variation range is 1.5% (standard deviation×3=1.5%), the signal qualities may respectively be (A)=8.5% to 11.5% and (B)=10.5% to 13.5%. In this case, there is a possibility that the value of (A) and the value of (B) are made equal to each other. Accordingly, the deterioration detection processor 110 determines that (A)= (B).

Specifically, the deterioration detection processor 110 may determine an upper limit and a lower limit, taking into consideration of a predetermined variation range, with respect to each of the detection values of the first comparison information and the second comparison information, in comparing the first comparison information and the second comparison information.

And, in the case where the range of the first comparison information from the upper limit to the lower limit thereof overlaps the range of the second comparison information from the upper limit to the lower limit thereof, the deterioration detection processor 110 may determine that the first comparison information and the second comparison information represent the same signal qualities as each other. Further, in the case where the range of the first comparison information from the upper limit to the lower limit thereof does not overlap the range of the second comparison information from the upper limit to the lower limit thereof, the deterioration detection processor 110 may determine that the signal quality of the information in a higher range is higher than the signal quality of the information in a lower range. The same idea is applied to a case in which the basic information is compared with the first comparison information or with the second comparison information.

The aforementioned variation range may be set by performing measurement for reproducing information and acquiring information representing a signal quality multiple times, obtaining a standard deviation from the measurement results, and based on the obtained standard deviation. In the above configuration, a range obtained by multiplying the standard deviation by a predetermined value e.g. a value obtained by triplicating the standard deviation may be set as the variation range. And, the deterioration detection processor 110 may store the thus set variation range. Alternatively, the variation range may be stored in the non-volatile memory 120 (see FIG. 10).

As described above, it is possible to detect deterioration of media data by comparing signal qualities the basic information, the first comparison information, and the second comparison information respectively represent. Further, the advantageous effect can also be obtained that it is possible to detect media data deterioration, without newly using a reference device such as a reference medium or a reference drive device for acquiring signal qualities the basic information, the first comparison information, and the second comparison information respectively represent. Thus, the optical disc drive device 1 is not complicated, and a cost increase accompanied by complication of the optical disc drive device 1 is suppressed.

Specifically, in the case where the condition: (first comparison information)<(second comparison information) is satisfied, the deterioration detection processor 110 may determine that the signal quality of the information recorded in the optical disc 2 is deteriorated. Further, in the case where the condition: (basic information)=(second comparison information)>(first comparison information) is satisfied, the deterioration detection processor 110 may determine that the signal quality of the information recorded in the optical disc 2 is deteriorated. Further, in the case where the condition: (basic information)>(second comparison information)>(first comparison information) is satisfied, the deterioration detection processor 110 may determine that the signal quality of the information recorded in the optical disc 2 is deteriorated.

Here, the sign "=" means that signal qualities are equal to each other, the sign ">" means that the signal quality on the left side is better (quality is higher), and the sign "<" means that the signal quality on the right side is better (quality is higher). In these cases, as described above, it should be noted that the signal qualities may be compared, with use of an average value, or taking into consideration of a variation range.

Here, in the case where the deterioration detection processor 110 determines that media data is deteriorated, the possibility that it becomes impossible to reproduce the data recorded in the optical disc 2, that is, the possibility of loss of media data, due to the progress of the deterioration of the media data, is high. In a worst case, a problem arises that the user data is lost. Countermeasures against such user data loss are described referring to FIG. 12 and FIG. 13.

Figure 12:
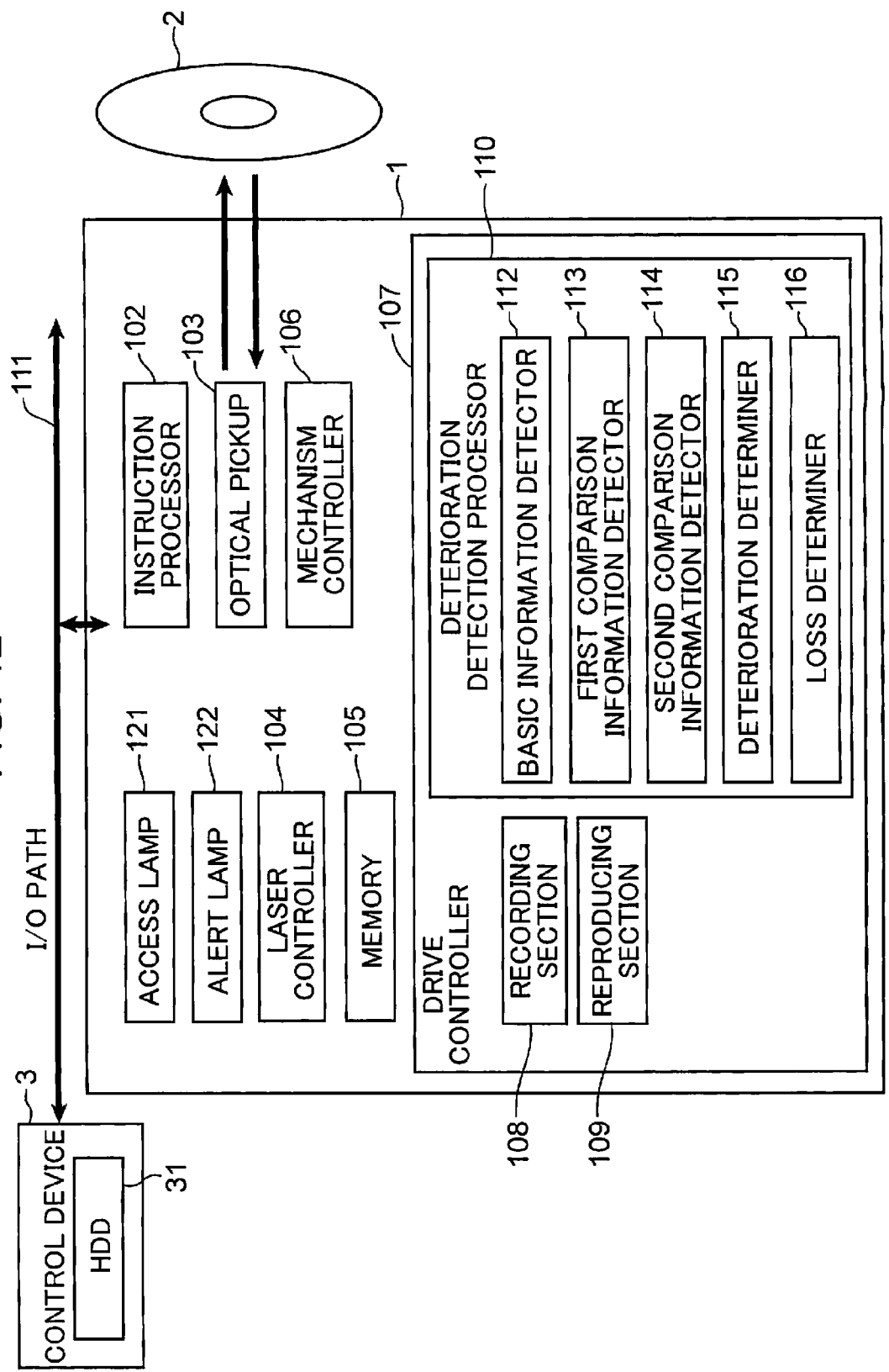
FIG. 12 is a diagram showing another configuration example of the optical disc drive device according to the embodiment of the invention.

FIG. 12 is a block diagram showing another configuration example of the optical disc drive device 1 according to the embodiment. In the following, the same reference signs are used for substantially the same configuration as described referring to FIG. 1, and repeated description of the same configuration is omitted. A deterioration detection processor 110 in FIG. 12 is, in addition to the configuration of the deterioration detection processor 110 shown in FIG. 1, provided with a loss determiner 116 that determines the possibility of media data loss by comparing a signal quality of a signal reproduced from the optical disc 2 with a predetermined value.

Figure 13:
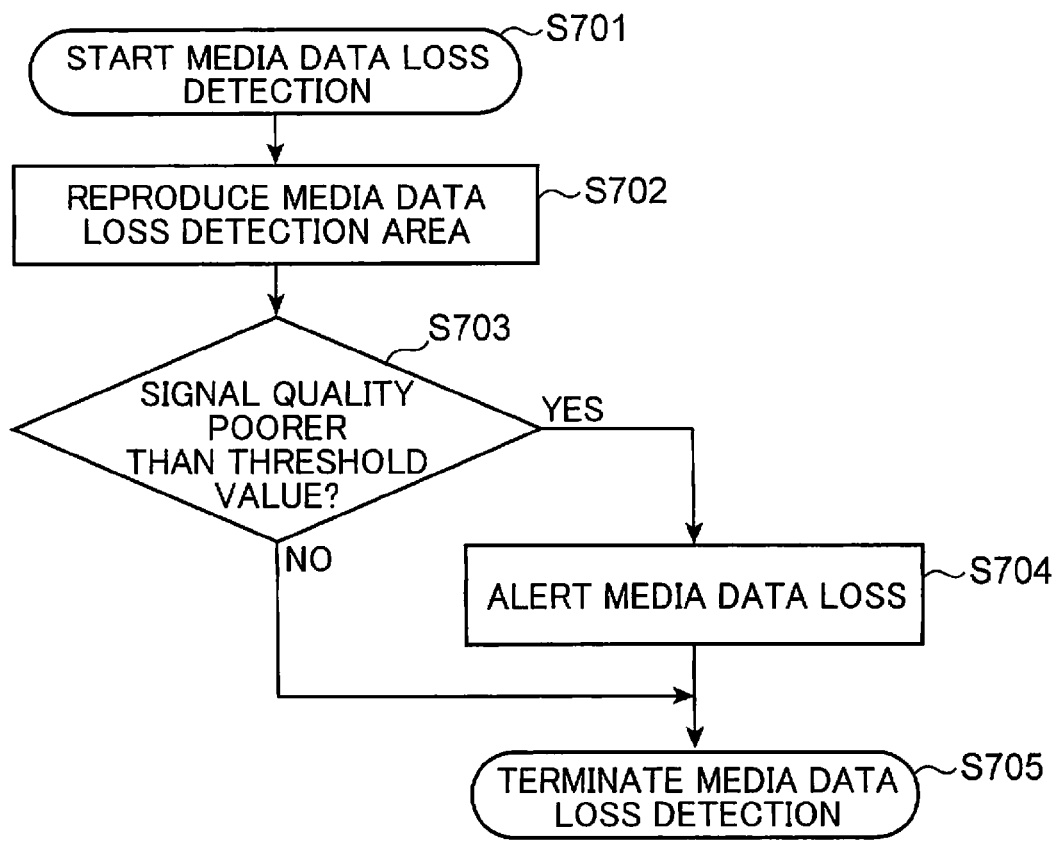
FIG. 13 is a diagram showing an example of a flowchart for detecting media data loss in the embodiment of the invention.

Next, a concrete example of media data loss detection to be performed by the deterioration detection processor 110 is described referring to the flowchart of FIG. 13.

In the case where it is determined that media data is deteriorated in the media data deterioration detection, the media data loss detection is started for detecting whether there is a possibility of media data loss (Step S701). Firstly, the deterioration detection processor 110 detects third comparison information representing a signal quality by reproducing a media data loss detection area (to be described later) which is a predetermined area in the optical disc 2 for detecting a degree of media data deterioration (Step S702).

Then, it is determined whether there is a possibility of loss in the third comparison information, detected in Step S702, representing a signal quality (Step S703). The processing of Step S703 corresponds to the processing to be performed by the loss determiner 116. Here, in the case where the third comparison information representing a signal quality is better (higher) than a predetermined threshold value (NO in Step S703), the loss determiner 116 determines that the possibility of losing media data is low, although the media data is deteriorated, and terminates the media data loss detection (Step S705).

On the other hand, in the case where the third comparison information representing a signal quality, which has been detected in Step S702, is worse (lower) than the predetermined threshold value (YES in Step S703), the loss determiner 116 determines that the possibility of losing media data is increased, and the deterioration detection processor 110 issues an alert to the control device 3 via the instruction processor 102 and the I/O path 111 for prompting the user of recovery or maintenance of media data.

Here, as a method for issuing an alert, a pop-up image indicative of an alert may be displayed on a screen of the control device 3, or an alarm sound may be generated. Further, as shown in FIG. 12, the optical disc drive device 1 may be provided with an alert section such as an alert lamp 122 for issuing an alert. Further, as shown in FIG. 12, an access lamp 121. provided in the optical disc drive device 1 may be used as an alert section, and alerting may be performed by blinking the access lamp 121.

Here, the threshold value of signal quality for detecting media data loss, which is used in Step S703 of FIG. 13, is determined by a time required for recovering data after an alert is issued. For instance, if a system, a user, or a support system is capable of recovering data within a short time after an alert is issued, a value immediately before data reproduction becomes impossible may be set as the threshold value.

Further, for example, in the case where it is impossible to recover data within a short time after an alert is issued, a threshold value at which data reproduction is secured until recovery is carried out may be obtained, based on a relationship between a time required for recovery after an alert is issued, and a media data deterioration speed (i.e. a degree of progress of media data deterioration until the time when recovery is carried out after an alert is received). Further, taking into consideration of an interval for detecting media data deterioration, a threshold value may be determined with use of information representing a degree of progress of media data deterioration until next-time media data deterioration detection is performed.

Specifically, the deterioration detection processor 110 may set, as the threshold value to be used in Step S703, a worst signal quality in a range of the signal qualities in which information can be reproduced (i.e. a lowest signal quality in a range of the signal qualities in which information can be reproduced) in accordance with the characteristics of the reproducing section 109. Further, the deterioration detection processor 110 may set, as the threshold value to be used in Step S703, a signal quality better than a worst signal quality in a range of the signal qualities in which information can be reproduced, by a predetermined margin (i.e. a signal quality higher than a lowest signal quality in a range of the signal qualities in which information can be reproduced, by a predetermined margin) in accordance with the characteristics of the reproducing section 109. The deterioration detection processor 110 stores the threshold value to be used in Step S703. Alternatively, the threshold value to be used in Step S703 may be stored in the non-volatile memory 120 (see FIG. 10).

The user can easily check whether the possibility of losing media data recorded in the optical disc 2 is increased by performing the operation shown in FIG. 13. Thus, the user can perform countermeasures against media data loss before the media data is lost.

Figure 14:
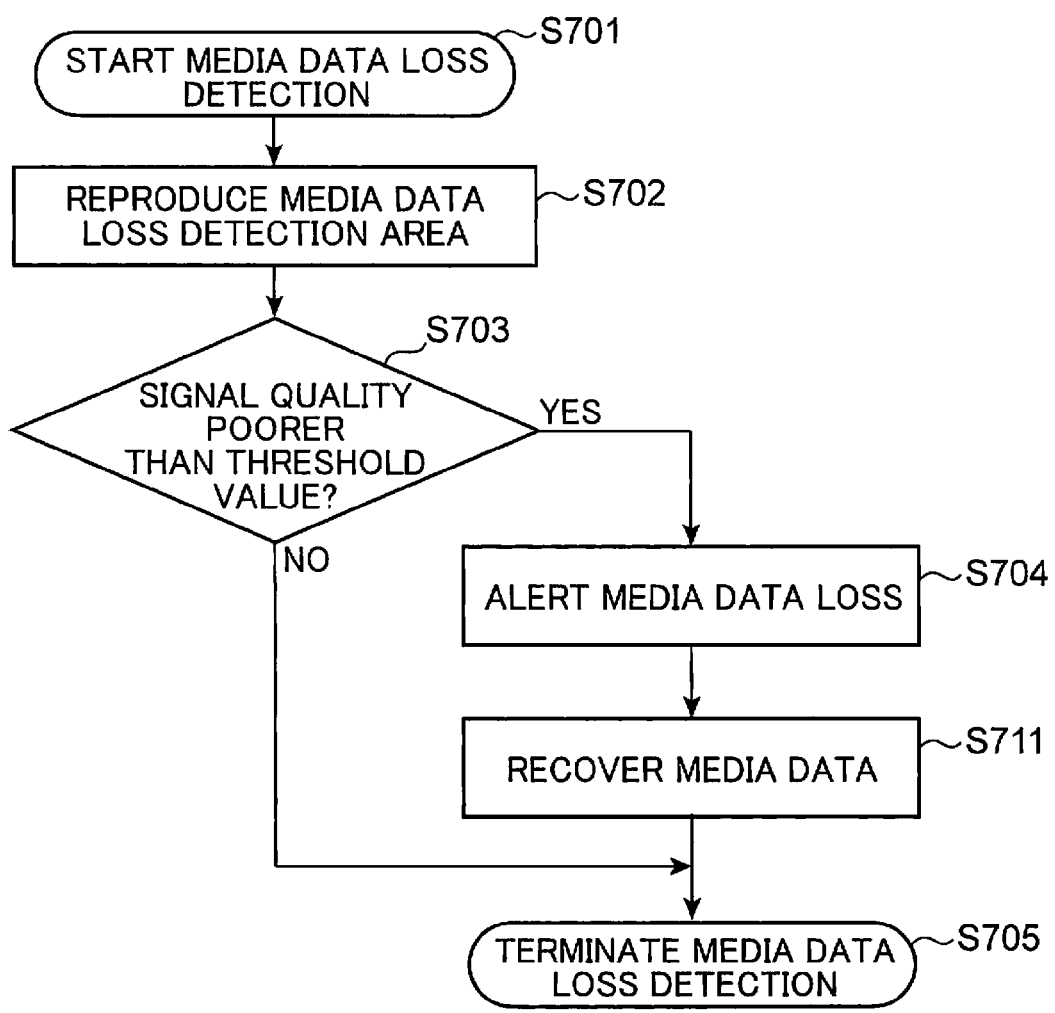
FIG. 14 is a diagram showing another example of the flowchart for detecting media data loss in the embodiment of the invention.

Next, a case in which a processing of recovering media data is added in the deterioration detection processor 110 is described referring to the flowchart of FIG. 14. In the following, the same reference signs are used for substantially the same processing as described referring to FIG. 13, and repeated description of the same processing is omitted.

Referring to FIG. 14, subsequent to Step S704 of issuing an alert indicative of media data loss, the deterioration detection processor 110 activates the recording section 108 to recover the data in an area having a possibility of media data loss (Step S711). As a method for recovering data, in the case of a rewritable optical disc, the deterioration detection processor 110 may overwrite the same data in the area having the possibility of media data loss with use of the recording section 108. Further, in the case of a rewritable optical disc/a recordable optical disc, the deterioration detection processor 110 may register an area in which data is deteriorated as a defective area, and may record the data for replacement in the ISA 506 or in the OSA 507, each of which is a spare area, or may record the data in an unrecorded area in the user data area 505, with use of the recording section 108.

Further, referring to FIG. 14, the deterioration detection processor 110 may perform data recovery (Step S711), without issuing an alert in Step S704.

Further, in the case of recovering data, the deterioration detection processor 110 may recover only the media data loss detection area, or may recover the data in an area including the vicinity of the media data loss detection area. Alternatively, in the case where the amount of data for which recovery is required is large, the deterioration detection processor 110 may rewrite all the data in another optical disc, with use of the recording section 108.

By performing the above operation, in addition to the fact that it is possible to easily check whether the possibility of losing media data recorded in the optical disc 2 is increased, it becomes possible to perform countermeasures against data loss before the media data is lost, without a user's operation.

In other words, the deterioration detection processor 110 may have a function of reproducing the information recorded in the optical disc 2 with use of the reproducing section 109 to detect the third comparison information, may have a function of comparing the third comparison information with a threshold value representing a predetermined signal quality, and may issue an alert when determining that the third comparison information is poorer than the predetermined threshold value.

Further, the deterioration detection processor 110 may have a function of reproducing the information recorded in the optical disc 2 with use of the reproducing section 109 to detect the third comparison information, may have a function of comparing the third comparison information with a threshold value representing a predetermined signal quality, and, when determining that the third comparison information is poorer than the predetermined threshold value, may recover the information in the area where the information is deteriorated while issuing an alert, or may recover the information in the area where the information is deteriorated without issuing an alert.

Next, the media data loss detection area to be reproduced in Step S702 of FIG. 13 and FIG. 14 is described.

The media data loss detection area is an area, in which the signal quality is worst among the data recorded in the optical disc 2. In other words, the deterioration detection processor 110 detects an area in which the signal quality is worst among the data recorded in the optical disc 2, and sets the signal quality in the area as a quality higher than a predetermined value. By performing the above operation, it is possible to eliminate a possibility of losing all the data recorded in the optical disc 2.

In the following, there is described a method for obtaining an area (media data loss detection area) having a worst signal quality to be performed by the deterioration detection processor 110, referring to the flowchart of FIG. 15.

Firstly, a processing of securing a media data loss detection area is started (Step S901). The condition for starting Step S901 is a timing when the optical disc 2 is loaded in the optical disc drive device 1, and the optical disc drive device 1 is activated. The optical disc 2 may be a disc in an unused state or a disc in a used state.

Then, data is recorded in the optical disc 2 and the recorded data is reproduced (Step S902). In Step S902, the data may be a user data recorded in a predetermined area of the data area 404. Alternatively, in Step S902, an area for generating a media data loss detection area may be secured in a predetermined area of the data area 404, and data may be recorded in the secured area. Further alternatively, the data recorded in an area such as the DMA1 through DMA4 or the TDMA 508 may be used.

Then, it is detected whether there exists a media data loss detection area (Step S903). In the case where there does not exist a media data loss detection area (NO in Step S903), the area in which data is recorded in Step S902 is set as the media data loss detection area (Step S904). On the other hand, in the case where there exists a media data loss detection area (YES in Step S903), the data in the media data loss detection area is reproduced (Step S905).

Here, a case that there exists a media data loss detection area is a case that data has been recorded in the optical disc 2 at least one time. Further, let us consider a case in which there already exists a media data loss detection area in the optical disc 2, and the optical disc drive device 1 is replaced by another one due to an influence such as disorder of the optical disc drive device 1. In this case, if Step S903 of determining whether there exists a media data loss detection area is not performed, it is impossible to know an area having a worst signal quality among the data recorded in the optical disc 2 before the optical disc drive device 1 is replaced. In view of the above, the processings of Step S903 and Step S905 are necessary.

Then, the signal quality detected in Step S902 is compared with the signal quality detected in Step S905 (Step S906). Here, in the case where the signal quality detected in Step S902 is poorer (lower) than the signal quality detected in Step S905 (YES in Step S906), the area detected in Step S902 is determined to be a media data loss detection area (Step S904). On the other hand, in the case where the signal quality detected in Step S905 is poorer (lower) than the signal quality detected in Step S902 (NO in Step S906), the area used in Step S905 is determined to be a media data loss detection area (Step S907).

Then, it is determined whether the optical disc 2 is to be disposed of (Step S908). Examples of a case of disposing the optical disc 2 include a case in which the user decides that the data recorded in the optical disc 2 is unnecessary, a case in which a certain condition is satisfied (for instance, a predetermined period (e.g. fifty years) has passed from the time when data was recorded in the optical disc 2 for the first time), and a case in which the optical disc 2 is not necessary any more because the data in the optical disc 2 is transferred to another disc due to data deterioration.

In the case where the optical disc 2 is disposed of (YES in Step S908), the optical disc 2 is not used thereafter. Accordingly, the processing of securing a media data loss detection area is terminated. On the other hand, in the case where the optical disc 2 is not disposed of (NO in Step S908), the processing of Step S902 is performed, and the processing of securing a media data loss detection area is repeated. Here, the optical disc 2 is not disposed of, in the case where the recorded data is to be reproduced, even if there is no remaining recordable area in the optical disc 2.

In order to reproduce the media data loss detection area, position information of the media data loss detection area is necessary. Here, the deterioration detection processor 110 records the position information of the media data loss detection area in a predetermined area of the optical disc 2. For instance, the deterioration detection processor 110 may secure the DA 509 or a part of the user data area 505 to record the position information of the media data loss detection area.

Further, the optical disc drive device 1 may be further provided with an information recording medium such as the non-volatile memory 120 (see FIG. 10), and the deterioration detection processor 110 may record the position information of the media data loss detection area in the non-volatile memory 120. Further, the deterioration detection processor 110 may record the position information of the media data loss detection area, via the instruction processor 102, in a recording medium such as the hard disk drive (HDD) 31 (see FIG. 1) or the non-volatile memory 32 (see FIG. 11) provided in the control device 3 to be connected via the I/O path 111.

Further, in the case where the optical disc drive device 1 is being operated, or is in a power-on state, the deterioration detection processor 110 may store the position information of the media data loss detection area in the memory 105. And, only in the case where the power source of the optical disc drive device 1 is turned off, the deterioration detection processor 110 may record the position information of the media data loss detection area in a predetermined area in the optical disc 2 or in an information recording medium such as the non-volatile memory 120 provided in the optical disc drive device 1, as described above. Further, only in the case where the power source of the optical disc drive device 1 is turned off, the deterioration detection processor 110 may record the position information of the media data loss detection area, via the instruction processor 102, in a recording medium such as the hard disk drive (HDD) 31 (see FIG. 1) or the non-volatile memory 32 (see FIG. 11) provided in the control device 3 to be connected via the I/O path 111.

Further, in the case where the media data loss detection area is determined with use of user data, the processings of Steps S903 through S908 shown in FIG. 15 may be performed each time the user data is recorded. Further, the processings of Steps S903 through S908 shown in FIG. 15 may be performed at a cycle obtained from the storage characteristics of the optical disc 2 or at any cycle determined by a system.

Here, the deterioration detection processor 110 may recover data in the media data loss detection area in performing data recovery. Further, a fact that the media data loss detection area is deteriorated may indicate that the possibility of media data loss is also increased in an area including the vicinity of the media data loss detection area. In view of the above, the deterioration detection processor 110 may recover data in the area including the vicinity of the media data loss detection area. Further, there is a case, in which the possibility of media data loss is also increased in an area in which data was recorded substantially in the same period as the media data loss detection area. In view of the above, the deterioration detection processor 110 may recover data in the area in which data was recorded substantially in the same period as the media data loss detection area.

Further, in the case where a certain area is designated as a media data loss detection area in the past, and thereafter, the media data loss detection area is updated because the signal quality of a newly recorded area is poor, the possibility of media data loss may be increased not only in the latest media data loss detection area but also in the previous media data loss detection area.

In view of the above, the deterioration detection processor 110 may store the information relating to the previous media data loss detection area, as well as the information relating to the latest media data loss detection area, and may recover data in an area including the previous media data loss detection area at the time of data recovery. Further, the deterioration detection processor 110 may recover data in an area including the vicinity of the previous media data loss detection area, and in an area in which data was recorded substantially in the same period as the previous media data loss detection area.

It is to be noted that the deterioration detection processor 110 can determine whether the area is an area in which data was recorded substantially in the same period as the media data loss detection area, with use of the recording management information to be recorded in the DMA1 through DMA4, the TDMA 508, and the like.

It is possible to set a signal quality of the media data loss detection area as a worst signal quality among the data recorded in the optical disc 2 by determining the media data loss detection area as shown in the flowchart of FIG. 15. Thus, the deterioration detection processor 110 is operable to check the possibility of media data loss by checking the signal quality of the media data loss detection area.

In the foregoing description with reference to the flowchart of FIG. 15, the processing has been described with use of an area in which information having a worst signal quality is recorded, as the media data loss detection area. Information representing a signal quality obtained by reproducing the area in which information having a worst signal quality is recorded is information representing a worst signal quality. Therefore, the information representing a signal quality obtained by reproducing the area in which information having a worst signal quality is recorded may be obtained as the information representing a worst signal quality.

In other words, the deterioration detection processor 110 may detect information having a worst signal quality among the information recorded in the optical disc 2, and may acquire information representing a signal quality to be obtained by reproducing the detected information having a worst signal quality, as the third comparison information.

Further, the deterioration detection processor 110 may compare information representing a signal quality to be obtained by reproducing information recorded at the time of start of using the optical disc 2, with information representing a signal quality to be obtained by reproducing information recorded in a predetermined area thereafter, and may acquire information representing a poorer signal quality between the two information, as the third comparison information.

Further, the deterioration detection processor 110 may generate a media data loss detection area in a predetermined area of the optical disc 2, and may use the media data loss detection area at any time. At this time, in recording data in the media data loss detection area with use of the recording section 108, the deterioration detection processor 110 may cause the mechanism controller 106 to apply servo stress such as defocusing, or may cause the laser controller 104 to lower the recording power, to generate data having a poor signal quality (i.e. a low signal quality) in advance.

Specifically, the deterioration detection processor 110 may set the signal quality of the media data loss detection area to a signal quality higher than the signal quality, at which the reproducing section 109 of the optical disc drive device 1 becomes unable to reproduce, by a predetermined value. The signal quality of the media data loss detection area is not limited to the above. In the following, a worst signal quality in a range of the signal qualities reproducible by the reproducing section 109 (i.e. a lowest signal quality in a range of the signal qualities reproducible by the reproducing section 109) is called as a lowest signal quality.

The deterioration detection processor 110 may set the signal quality of the media data loss detection area to a signal quality better than the lowest signal quality by a predetermined value. Alternatively, the deterioration detection processor 110 may set the signal quality of the media data loss detection area to a lowest signal quality (i.e. the aforementioned predetermined value may be set to zero).

Further, data to be recorded in an area other than the media data loss detection area, such as user data, is recorded with a signal quality better than the signal quality detected at the time of generating the media data loss detection area, without fail.

With the above configuration, it is possible to set the media data loss detection area, as an area in which the information having a worst signal quality is recorded among the data recorded in the optical disc 2. This makes it unnecessary to update the media data loss detection area, each time a recording operation is performed. Thus, the deterioration detection processor 110 is capable of securing a media data loss detection area without lowering the performance such as the recording/reproducing speed of the optical disc drive device 1.

In other words, the deterioration detection processor 110 may set the signal quality information obtained by reproducing the information recorded in a predetermined area of the optical disc 2, as the third comparison information, and may record information with use of the recording section 108 in such a manner that the third comparison information becomes the information representing a poorer signal quality than the information representing a predetermined signal quality. Alternatively, the deterioration detection processor 110 may record information with use of the recording section 108 in such a manner that the third comparison information has a signal quality higher than the signal quality, at which the reproducing section 109 becomes unable to reproduce, by a predetermined value. Further alternatively, the deterioration detection processor 110 may record information with use of the recording section 108 in such a manner that the third comparison information has a signal quality higher than a lowest signal quality in a range of the signal qualities reproducible by the reproducing section 109, by a predetermined value. Furthermore, the deterioration detection processor 110 may record information with use of the recording section 108 in such a manner that the third comparison information has a lowest signal quality in a range of the signal qualities reproducible by the reproducing section 109.

It is to be noted that the area in which the basic information is detected and the area in which the second comparison information is detected, described in this embodiment, are physically different areas (different blocks 402) from each other. However, there is no specific limitation regarding the areas in which other signal quality information is detected, and these areas may be physically identical areas (blocks 402).

The foregoing embodiment mainly includes the invention having the following features.

An information recording and reproducing device according to an aspect of the invention is an information recording and reproducing device that records and reproduces information in a recording medium, comprises: a recording section which records information in the recording medium; a reproducing section which reproduces the information recorded in the recording medium; and a deterioration detection processor which detects deterioration of a signal quality of the information recorded in the recording medium, wherein the deterioration detection processor reproduces information recorded in a first area of the recording medium, with use of the reproducing section, to acquire first comparison information representing a signal quality, records information, with use of the recording section, in a second area of the recording medium different from the first area after the information recorded in the first area is recorded in the first area, and reproduces, with use of the reproducing section, the information recorded in the second area to acquire second comparison information representing a signal quality, and determines that the signal quality of the information recorded in the recording medium is deteriorated, in a case where the second comparison information represents a signal quality higher than that represented by the first comparison information.

According to the above configuration, information is recorded in the recording medium by the recording section. The information recorded in the recording medium is reproduced by the reproducing section. Deterioration of the signal quality of the information recorded in the recording medium is detected by the deterioration detection processor. The information recorded in the first area of the recording medium is reproduced with use of the reproducing section, and the first comparison information representing a signal quality is acquired, by the deterioration detection processor. Information is recorded, with use of the recording section, in a second area of the recording medium different from the first area after the information recorded in the first area is recorded in the first area, the information recorded in the second area is reproduced, with use of the reproducing section, and second comparison information representing a signal quality is acquired, by the deterioration detection processor. The signal quality of the information recorded in the recording medium is determined to be deteriorated by the deterioration detection processor, in a case where the second comparison information represents a signal quality higher than that represented by the first comparison information. Here, the information, based on which the second comparison information is acquired, is recorded in the recording medium, after the information, based on which the first comparison information is acquired, is recorded. Accordingly, the fact that the second comparison information represents a signal quality higher than that represented by the first comparison information means that the information, based on which the first comparison information is acquired, may be deteriorated during a lapse of a time period from the time when the information, based on which the first comparison information is acquired, was recorded. Thus, the above configuration enables to accurately detect deterioration of information in the recording medium without the need of a specific structure or a reference recording medium for detecting deterioration of information.

In the information recording and reproducing device, the deterioration detection processor may record, with use of the recording section, the information in the first area of the recording medium, and reproduces, subsequent to the recording, with use of the reproducing section, the information recorded in the first area to acquire basic information representing a signal quality, may acquire the first comparison information and the second comparison information after a lapse of a predetermined time period from a time when information, based on which the basic information is acquired, was recorded, and may determine whether the signal quality of the information recorded in the recording medium is deteriorated also using the basic information.

According to the above configuration, by the deterioration detection processor, information is recorded in the first area of the recording medium with use of the recording section, the recorded information is reproduced, subsequent to the recording, with use of the reproducing section, and the basic information representing a signal quality is acquired. The first comparison information and the second comparison information are acquired by the deterioration detection processor after a lapse of the predetermined time period from the time when the information, based on which the basic information is acquired, was recorded. It is determined, by the deterioration detection processor, whether the signal quality of the information recorded in the recording medium is deteriorated, also using the basic information. With the above configuration, it is possible to accurately determine that the information recorded in the recording medium is deteriorated.

In the information recording and reproducing device, the deterioration detection processor may determine that the signal quality of the information recorded in the recording medium is deteriorated, in a case where the second comparison information represents a signal quality higher than that represented by the first comparison information, and in a case where the basic information represents a signal quality higher than that represented by the second comparison information.

According to the above configuration, in a case where the second comparison information represents a signal quality higher than that represented by the first comparison information, and in a case where the basic information represents a signal quality higher than that represented by the second comparison information, the signal quality of the information recorded in the recording medium is determined to be deteriorated by the deterioration detection processor. Here, the information, based on which the second comparison information is acquired, is recorded in the recording medium after a lapse of the predetermined time period from the time when the information, based on which the first comparison information is acquired, i.e., the information, based on which the basic information is acquired, was recorded. Thus, the fact that the second comparison information represents a signal quality higher than that represented by the first comparison information means that the information, based on which the first comparison information is acquired, i.e., the information, based on which the basic information is acquired, may be deteriorated during a lapse of the predetermined time period.

Further, in the above configuration, the basic information represents a higher quality than that represented by the first comparison information. The first comparison information is acquired after a lapse of the predetermined time period from the time when the information, based on which the basic information is acquired, was recorded. Accordingly, the fact that the basic information represents a signal quality higher than that represented by the first comparison information means that the information, based on which the first comparison information is acquired, i.e., the information, based on which the basic information is acquired, may be deteriorated during a lapse of the predetermined time period. Thus, the above configuration makes it possible to more accurately determine that the information recorded in the recording medium is deteriorated.

In the information recording and reproducing device, the deterioration detection processor may determine that the signal quality of the information recorded in the recording medium is deteriorated, in a case where the second comparison information represents a signal quality higher than that represented by the first comparison information, and in a case where the basic information represents a signal quality substantially equivalent to that represented by the second comparison information.

According to the above configuration, in a case where the second comparison information represents a signal quality higher than that represented by the first comparison information, and in a case where the basic information represents a signal quality substantially equivalent to that represented by the second comparison information, the signal quality of the information recorded in the recording medium is determined to be deteriorated by the deterioration detection processor. Here, the information, based on which the second comparison information is acquired, is recorded in the recording medium, after a lapse of the predetermined time period from the time when the information, based on which the first comparison information is acquired, i.e., the information, based on which the basic information is acquired, was recorded. Accordingly, the fact that the second comparison information represents a signal quality higher than that represented by the first comparison information means that the information, based on which the first comparison information is acquired, i.e., the information based on which the basic information is acquired, may be deteriorated during a lapse of the predetermined time period.

Further, the information, based on which the second comparison information is acquired, is recorded in the recording medium after a lapse of the predetermined time period from the time when the information, based on which the basic information is acquired, was recorded. Accordingly, the fact that the basic information represents a signal quality substantially equivalent to that represented by the second comparison information means that none of the recording performance of the recording medium, the recording performance of the recording section, and the reproducing performance of the reproducing section is deteriorated during a lapse of the predetermined time period.

As described above, in this configuration, it means that the information, based on which the first comparison information is acquired, i.e., the information, based on which the basic information is acquired, is deteriorated during a lapse of the predetermined time period. Thus, the above configuration makes it possible to more accurately determine that the information recorded in the recording medium is deteriorated.

In the information recording and reproducing device, the deterioration detection processor may record the basic information in the recording medium with use of the recording section.

According to the above configuration, the basic information is recorded in the recording medium with use of the recording section by the deterioration detection processor. The above configuration enables to store the basic information for a long period, whereby it is possible to detect data deterioration even in a case where the recording medium is used for a long period.

The information recording and reproducing device may further include an output section which outputs information to an external storage section, wherein the deterioration detection processor may store the basic information in the external storage section with use of the output section.

According to the above configuration, information is outputted to the external storage section by the output section. The basic information is stored in the external storage section with use of the output section by the deterioration detection processor. The above configuration makes it possible to store the basic information for a long period. Further, it is possible to prevent lowering of the performance such as a recording operation, because it is not necessary to record the basic information in the recording medium.

In the information recording and reproducing device, the deterioration detection processor may reproduce the information recorded in the recording medium with use of the reproducing section to acquire third comparison information representing a signal quality, and may issue an alert, in a case where the third comparison information represents a signal quality lower than a predetermined threshold value representing a signal quality.

According to the above configuration, the information recorded in the recording medium is reproduced with use of the reproducing section, and the third comparison information representing a signal quality is acquired, by the deterioration detection processor. In a case where the third comparison information represents a signal quality lower than the predetermined threshold value representing a signal quality, an alert is issued by the deterioration detection processor. The above configuration enables to issue an alert indicating information loss to the user using the information recording and reproducing device, in a case where the signal quality of the information recorded in the recording medium is lowered than the predetermined threshold value due to deterioration, and there is a possibility of losing information.

In the information recording and reproducing device, the deterioration detection processor may recover the information in an area where the signal quality of the recorded information is deteriorated, in a case where the third comparison information represents a signal quality lower than the predetermined threshold value.

According to the above configuration, in a case where the third comparison information represents a signal quality lower than the predetermined threshold value, the information in the area where the signal quality of the recorded information is deteriorated is recovered by the deterioration detection processor. The above configuration enables to recover the information in the area in which the third comparison information represents a signal quality lower than the predetermined threshold value, and there is a possibility of losing information, without a user's operation.

In the information recording and reproducing device, the deterioration detection processor may reproduce the information recorded in the recording medium with use of the reproducing section to acquire third comparison information representing a signal quality, and may recover the information in an area where the signal quality of the recorded information is deteriorated, in a case where the third comparison information represents a signal quality lower than a predetermined threshold value representing a signal quality.

According to the above configuration, the information recorded in the recording medium is reproduced with use of the reproducing section, and the third comparison information representing a signal quality is acquired, by the deterioration detection processor. In a case where the third comparison information represents a signal quality lower than the predetermined threshold value representing a signal quality, the information in the area where the signal quality of the recorded information is deteriorated is recovered by the deterioration detection processor. The above configuration enables to recover the information in the area where the third comparison information represents a signal quality lower than the predetermined threshold value, and there is a possibility of losing information, without a user's operation.

In the information recording and reproducing device, the deterioration detection processor may acquire, as the third comparison information, information representing a lowest signal quality, among the information recorded in the recording medium.

According to the above configuration, the information representing a lowest signal quality among the information recorded in the recording medium is acquired as the third comparison information by the deterioration detection processor. With the above configuration, it is possible to manage the signal quality of the information in the area in which the information of a lowest signal quality is recorded among the information recorded in the recording medium, i.e., to manage the signal quality of the information in the area in which the possibility of losing information is highest, and it is possible to prevent information loss.

In the information recording and reproducing device, the deterioration detection processor may compare information representing a signal quality to be obtained by reproducing the information recorded in the recording medium at a time of start of using the recording medium, with information representing a signal quality to be obtained by reproducing the information recorded thereafter, and may acquire, as the third comparison information, information representing a lower signal quality between the two information.

According to the above configuration, the information representing a signal quality to be obtained by reproducing the information recorded in the recording medium at a time of start of using the recording medium, and the information representing a signal quality to be obtained by reproducing the information recorded thereafter are compared, and the information representing a lower signal quality between the two information is acquired as the third comparison information, by the deterioration detection processor. With the above configuration, it becomes possible to securely manage the information of a lowest signal quality among the information recorded in the recording medium.

In the information recording and reproducing device, a signal quality which is lowest in a range of signal qualities reproducible by the reproducing section is defined as a lowest signal quality, and the deterioration detection processor may record information in the recording medium with use of the recording section in such a manner that the signal quality of the information is higher than the lowest signal quality by a predetermined value, and acquires, as the third comparison information, information representing a signal quality obtained by reproducing the recorded information with use of the reproducing section.

According to the above configuration, a signal quality which is lowest in a range of signal qualities reproducible by the reproducing section is defined as a lowest signal quality. Information is recorded in the recording medium with use of the recording section, in such a manner that the signal quality of the information is higher than the lowest signal quality by a predetermined value, and the information representing a signal quality obtained by reproducing the recorded information with use of the reproducing section is acquired as the third comparison information, by the deterioration detection processor. With the above configuration, it becomes possible to specify an area in which information of a lowest signal quality is recorded among the information recorded in the recording medium, and to easily manage the area.

An information recording and reproducing method according to an aspect of the invention is an information recording and reproducing method that records and reproduces information in a recording medium, includes: reproducing information recorded in a first area of the recording medium to acquire first comparison information representing a signal quality; recording information in a second area of the recording medium different from the first area after the information recorded in the first area is recorded in the first area, and reproducing the information recorded in the second area to acquire second comparison information representing a signal quality; and determining that the signal quality of the information recorded in the recording medium is deteriorated, in a case where the second comparison information represents a signal quality higher than that represented by the first comparison information.

According to the above configuration, the information recorded in the first area of the recording medium is reproduced and a first comparison information representing a signal quality is acquired. Information is recorded in a second area of the recording medium different from the first area after the information recorded in the first area is recorded in the first area, the information recorded in the second area is reproduced, and second comparison information representing a signal quality is acquired. It is determined that the signal quality of the information recorded in the recording medium is deteriorated, in a case where the second comparison information represents a signal quality higher than that represented by the first comparison information. With the above configuration, it becomes possible to accurately detect deterioration of information in the recording medium, without the need of a specific configuration or a reference recording medium for detecting information deterioration.

Industrial Applicability

The information recording and reproducing device and the information recording and reproducing method according to the invention are provided with a function of detecting data deterioration to thereby prevent loss of data recorded by the user, which makes it possible to enhance the reliability. Further, the information recording and reproducing device and the information recording and reproducing method according to the invention can also be applicable for use such as an archive system incorporated with a recording medium.

The invention claimed is:

1. An information recording and reproducing device that records and reproduces information in a recording medium, comprising:
   a recording section which records information in the recording medium;
   a reproducing section which reproduces the information recorded in the recording medium; and
   a deterioration detection processor which detects deterioration of a signal quality of the information recorded in the recording medium, wherein
   the deterioration detection processor:
      reproduces information recorded in a first area of the recording medium, with use of the reproducing section, to acquire first comparison information representing a signal quality;
      records information, with use of the recording section, in a second area of the recording medium different from the first area after the information recorded in the first area is recorded in the first area, and reproduces, with use of the reproducing section, the information recorded in the second area to acquire second comparison information representing a signal quality; and
      determines that the signal quality of the information recorded in the recording medium is deteriorated, in a case where the second comparison information represents a signal quality higher than that represented by the first comparison information.

2. The information recording and reproducing device according to claim 1, wherein
   the deterioration detection processor:

records, with use of the recording section, the information in the first area of the recording medium, and reproduces, subsequent to the recording, with use of the reproducing section, the information recorded in the first area to acquire basic information representing a signal quality;

acquires the first comparison information and the second comparison information after a lapse of a predetermined time period from a time when information, based on which the basic information is acquired, was recorded; and determines whether the signal quality of the information recorded in the recording medium is deteriorated also using the basic information.

3. The information recording and reproducing device according to claim 2, wherein the deterioration detection processor determines that the signal quality of the information recorded in the recording medium is deteriorated, in a case where the second comparison information represents a signal quality higher than that represented by the first comparison information, and in a case where the basic information represents a signal quality higher than that represented by the second comparison information.

4. The information recording and reproducing device according to claim 2, wherein the deterioration detection processor determines that the signal quality of the information recorded in the recording medium is deteriorated, in a case where the second comparison information represents a signal quality higher than that represented by the first comparison information, and in a case where the basic information represents a signal quality substantially equivalent to that represented by the second comparison information.

5. The information recording and reproducing device according to claim 2, wherein the deterioration detection processor records the basic information in the recording medium with use of the recording section.

6. The information recording and reproducing device according to claim 2, further comprising an output section which outputs information to an external storage section, wherein the deterioration detection processor stores the basic information in the external storage section with use of the output section.

7. The information recording and reproducing device according to claim 1, wherein the deterioration detection processor:
reproduces the information recorded in the recording medium with use of the reproducing section to acquire third comparison information representing a signal quality; and issues an alert, in a case where the third comparison information represents a signal quality lower than a predetermined threshold value representing a signal quality.

8. The information recording and reproducing device according to claim 7, wherein the deterioration detection processor recovers the information in an area where the signal quality of the recorded information is deteriorated, in a case where the third comparison information represents a signal quality lower than the predetermined threshold value.

9. The information recording and reproducing device according to claim 1, wherein the deterioration detection processor:
reproduces the information recorded in the recording medium with use of the reproducing section to acquire third comparison information representing a signal quality; and recovers the information in an area where the signal quality of the recorded information is deteriorated, in a case where the third comparison information represents a signal quality lower than a predetermined threshold value representing a signal quality.

10. The information recording and reproducing device according to claim 7, wherein the deterioration detection processor acquires, as the third comparison information, information representing a lowest signal quality, among the information recorded in the recording medium.

11. The information recording and reproducing device according to claim 10, wherein the deterioration detection processor:
compares information representing a signal quality to be obtained by reproducing the information recorded in the recording medium at a time of start of using the recording medium, with information representing a signal quality to be obtained by reproducing the information recorded thereafter; and acquires, as the third comparison information, information representing a lower signal quality between the two information.

12. The information recording and reproducing device according to claim 10, wherein a signal quality which is lowest in a range of signal qualities reproducible by the reproducing section is defined as a lowest signal quality, and the deterioration detection processor records information in the recording medium with use of the recording section in such a manner that the signal quality of the information is higher than the lowest signal quality by a predetermined value, and acquires, as the third comparison information, information representing a signal quality obtained by reproducing the recorded information with use of the reproducing section.

13. An information recording and reproducing method that records and reproduces information in a recording medium, comprising:

reproducing information recorded in a first area of the recording medium to acquire first comparison information representing a signal quality;

recording information in a second area of the recording medium different from the first area after the information recorded in the first area is recorded in the first area, and reproducing the information recorded in the second area to acquire second comparison information representing a signal quality; and determining that the signal quality of the information recorded in the recording medium is deteriorated, in a case where the second comparison information represents a signal quality higher than that represented by the first comparison information.

* * * * *